Feb. 1, 1966 R. C. LAWLOR 3,233,085

LOGIC SYSTEM

Filed Jan. 25, 1965 7 Sheets-Sheet 1

INVENTOR.

Reed C. Lawlor

Feb. 1, 1966 R. C. LAWLOR 3,233,085

LOGIC SYSTEM

Filed Jan. 25, 1965 7 Sheets-Sheet 2

INVENTOR.

INVENTOR.
Reed C. Lawlor

INVENTOR.
Reed C. Lawlor

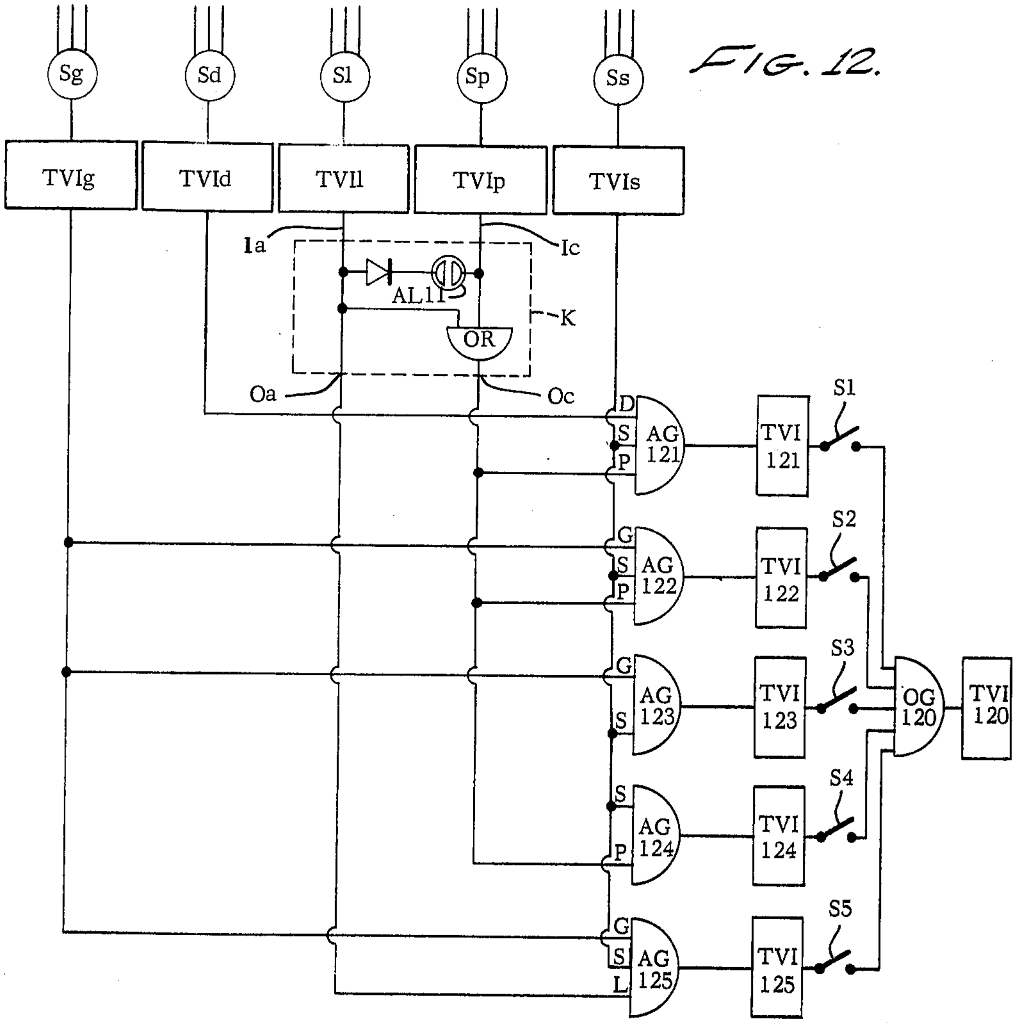
FIG. 12.
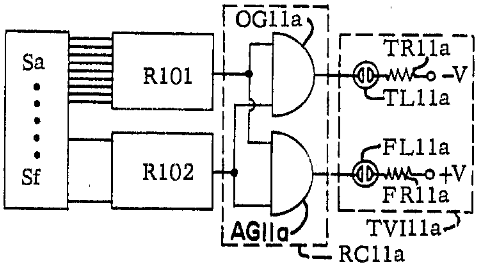
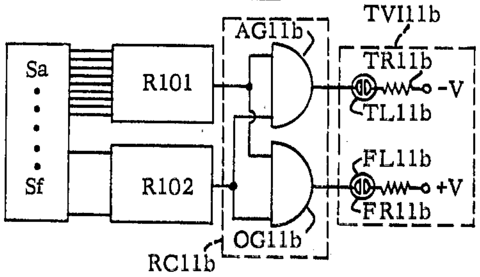
FIG. 11b.
FIG. 11a.
INVENTOR
Reed C. Lawlor INVENTOR.
Reed C. Lawlor INVENTOR.
Reed C. Lawlor United States Patent Office 3,233,085 Patented Feb. 1, 1966

3,233,085
LOGIC SYSTEM
Reed C. Lawlor, San Marino, Calif.
(412 W. 6th St., Los Angeles, Calif.)
Filed Jan. 25, 1965, Ser. No. 429,944
18 Claims. (Cl. 235—164)

This application is a continuation-in-part of my prior patent application, Serial No. 851,826, that was filed November 9, 1959, and now forfeited.

This invention relates to logic systems and more particularly to systems for solving problems in logic by means of multi-valued logic. More particularly, this invention relates especially to systems that may be employed for solving complex problems in epistemic logic, namely, logic that involves logically related propositions where the truth or falsity of some of the propositions is unknown even though the truth or falsity of other propositions are known.

In the most practical form of this invention discovered up to the present time, use is made of three-valued logic. In such a logic, the truth value of a proposition may assume any one of three values. This is to be contrasted with ordinary two-valued logic in which a proposition can assume only one of two truth values.

In ordinary two-valued logic, according to the law of excluded middle, a proposition must be either true, or else it must be false. It cannot be neither. But in the three-valued logic of this invention, a proposition may be neither true nor false.

In the analysis of practical problems in the field of epistemic logic a proposition may be known to be true, in which case it is true; or it may be known to be false, in which case it is false; or it may be of unknown truth or falsity, which to certain extent is analogous to being neither true nor false. Thus, epistemic logic involves three truth values instead of only two, and these three values are commonly present in various daily problems. This invention takes into account such three-fold possibilities.

Two-valued logic is almost universally employed in the solution of everyday practical problems that call upon the exercise of the reasoning process. However, it has been recognized for many years that such two-valued logic is not entirely reliable and is in fact completely unsuitable for the solution of many problems in logic. In spite of this, very little attention has been given to the development of multi-valued logic and even where some attention has been given to this development, very little use has actually been made of multi-valued logic. In fact, so far as I know, no methods have been developed for applying multi-valued logic to the solution of everyday practical logic problems, though as can be shown, a few suggestions have been made for mechanizing some of the laws and theorems of certain kinds of multi-valued logic.

Care must be exercised in distinguishing various kinds of multi-valued logic. Even in ancient times, Aristotle, and undoubtedly others, recognized that under some circumstances the law of excluded middle failed to produce reliable results. More particularly, Aristotle recognized that the law of excluded middle does not apply to the present statements respecting future contingencies. And in medieval times a logician named Ockham also recognized that the law of excluded middle was not always applicable (see A. N. Prior, page 241 infra). In more modern times, certain problems, such as the antinomies and the paradox of Epimenides, have attracted the attention of numerous logicians. It has been recognized that the difficulties encountered in the attempted solutions to such problems have their origin at least in part in assuming the law of excluded middle and numerous attempts have been made to circumvent these difficulties. In an effort to eliminate some of these difficulties without discarding the law of excluded middle, Bertrand Russell developed a "theory of types."

Other attempts to deal with the fact that the law of excluded middle is not of universal application were made by E. L. Post in 1921 ("Introduction to a General Theory of Elementary Propositions," Am. Journ. of Math. XLIII, p. 161) and by J. Lukasiewicz and A. Tarski at about the same time (Comptes Rendus Soc. D. Sciences Varsovie XXIII CLIII, p. 51). The principal system introduced by Post involved a process of cyclic negation, while the system introduced by Lukasiewicz and Tarski and also by Post involved a process of diametrical negation. These systems are discussed, for example, in "Symbolic Logic," by Lewis and Langford, and by A. N. Prior in "Formal Logic," pp. 230 ff. (Oxford 1955) and by Hans Reichenbach in "Philosophic Foundations of Quantum Mechanics," pp. 144 ff. (University of California Press, 1948). See also Paul Rosenbloom "The Elements of Mathematical Logic," p. 51 ff. (Dover 1950). At page 110 in their treatise "Multi-Valued Logic" (North Holland 1958), J. B. Rosser and A. R. Turquette appear to indicate that no useful applications had yet been found for multi-valued logic.

But as pointed out by Reichenbach, the original publication of Post and the publication of Lukasiewicz and Tarski left the question of application of their respective multi-valued logics open, and the writers restricted themselves to the formal construction of multi-valued calculi. In the logic of Post and the logic of Lukasiewicz and Tarski, the existence of more than two truth values is recognized. These systems, in fact, assign discrete truth values, not necessarily numerical, to various truth values.

In the three-valued logic developed by Lukasiewicz and Tarski, the truth values 1 and 0 are assigned to propositions which are true and false respectively, while the numerical value ½ is assigned to propositions which are contingent and therefore do not qualify as being either presently true or presently false. Reichenbach on the other hand has employed the numbers +1 and −1 as truth values of propositions which are true or false respectively and the value 0 to a proposition which is meaningless, or indeterminate.

This invention makes use of many of the logical principles set forth by Post, Lukasiewicz, Tarski and Reichenbach. But in addition it also makes use of some principles not found in the writings of these authors or elsewhere. Without attempting to write a treatise on logic and without attempting to demonstrate with rigor all of he principles relied upon in my logic system, some of the more important basic principles employed will be explained hereinafter together with a few elementary illustrations to enable the reader to understand the laws of logic that underlie my invention. However, as will appear, the basic invention may be employed satisfactorily and reliably by following the instructions for its use set forth hereinafter, even though the user may not fully understand all of the principles that underlie its use.

To establish the plausibility of the concepts of three-valued logic, consider a form of the paradox of Epimenides. Suppose that a person says: "I am now lying to you," and suppose that we inquire as to whether that statement is true or whether it is false. If it is assumed that the statement is true, then by its terms it is false. If we assume that it is false, then by its terms, it is true. In both cases we are thus led to a contradiction. This contradiction, however, does not appear if we admit the possibility that some statements are neither true nor false. As a matter of fact, a logic can be constructed which assumes that propositions are either true or else false or else neither true nor false.

Now suppose that we consider the statement: "It will rain tomorrow." Certainly, after tomorrow has passed either this statement will be true or less it will be false. A philosophical question arises as to whether the proposition is now true or now false. A similar problem arises with respect to the statement, "there will be a sea battle tomorrow." Instead of considering such statements true or false, some logicians have called them contingent.

But there is still at least one other class of situation which can be studied by means of principles of three-valued logic. Suppose that one considers the proposition: "Smith has been elected State Senator" or "Socrates is a man" or "Claim 1 is infringed." Each of these propositions may be true or false or "contingent," depending upon the time at which the statement is made. But regardless of this, if we represent such a statement by the symbol $p$, and if we represent its truth value by the symbol P or T($p$), we can speak about the truth value in the following terms:

(1) When $p$ is known to be true, $P=+1$.

(2) When it is not known whether $p$ is true, or whether $p$ is false, $P=0$.

(3) When it is known that $p$ is false, $P=-1$. Likewise, the "converse" applies, namely:

(1) When $P=+1$, it is known that $p$ is true.

(2) When $P=0$, it is not known whether $p$ is true or whether it is false.

(3) When $P=-1$, it is known that $p$ is false.

In the first case the proposition is of known truth, in the second of unknown truth or falsity, in the third of known falsity. Conditions involved in the second case are sometimes referred to herein as "don't know" conditions.

Logic dealing with known truth, unknown truth, known falsity or unknown falsity is sometimes known as epistemic logic.

In some instances, it is desirable to use the symbols T, N and F to represent the truth values of the three-valued logic employed herein. When these symbols are so used herein, they are equivalent to +1, 0, and −1, respectively.

This invention is based upon the recognition of the foregoing interpretations of the truth values of the three-valued logic employed herein. The logic employed herein is very similar to that employed by Reichenbach, in which the truth values with which he was concerned were:

(1) It is known that the measured value of a phenomenon lies within the range R.

(2) Whether or not the phenomenon lies within the range R, cannot be determined.

(3) It is false that the measured value of the phenomenon lies in the range R.

Reichenbach was concerned with Heisenberg's indetermination principle, and while that principle seems to have no application to ordinary problems in logic, at least Reichenbach's work represents an instance in which a three-valued logic like that employed herein has been used in reasoning about the world around us. In contrast, it will be shown hereinafter that three-valued logic can be applied to practical problems in logic and that machines can be constructed in accordance with this logic for solving such problems.

The same truth values +1, 0, −1 can be assigned to propositions which are true, neither true nor false, and false, respectively. Thus, the same logic that applies to the set of truth values known to be true, not known whether true or whether false, and known to be false also applies to the set of truth values true, neither true nor false, and false. However, the latter set of truth values true, neither true nor false, and false do not seem to have the same practical significance as the set of truth values known to be true, not known whether true or false, and known to be false. While the former set may have important application to be theory of logic, the latter set can be used to represent the state of a person's knowledge during the course of a reasoning process and the three-valued logic based on such a set can aid him in drawing correct conclusions. This invention makes it possible to perform these reasoning functions with a machine.

The principal laws of logic with which we are here concerned are described briefly as follows:

*Law of Inclusive Disjunction.*—When a compound proposition $p$ represents the logical sum of a series of propositions, $a$, $b$, $c$ . . ., the compound proposition may be written $$p=a+b+c+\ldots$$

In this case, the truth value P of the proposition $p$ is the largest of the truth values A, B, C, . . . of the propositions $a$, $b$, $c$, . . . . This, $$P=L(A, B, C, \ldots)$$

where the expression L indicates the largest of the values of the terms in parentheses. As an example of the application of this law assume that $$p=a+b$$

where $a$=it rained yesterday
$b$=Bill went to the mountains

Then the proposition $p$ is $p$=either it rained yesterday or Bill went to the mountains, or both It is to be noted here that the + sign is used as the symbol of inclusive disjunction.

Let us consider how the truth value of $p$ depends on the truth values of $a$ and $b$. Since there are only two terms $a$ and $b$ in the compound proposition and each can assume any one of three truth values, nine possible situations may arise. The following are typical.

If $A=+1$, then $P=+1$, regardless of the value of B. In other words, if it is known that it rained yesterday, then the compound proposition $p$ is known to be true, irrespective of whether it is known whether the statement "Bill went to the mountains" is true or false.

If $A=-1$ and $B=-1$, this means that it is known that it did not rain yesterday and it is known that Bill did not go to the mountains. In this case, $P=-1$. In other words, under these circumstances the compound proposition $p$ is known to be false.

Now suppose that we consider a situation in which only partial true-false information is available. Let it be assumed that $B=0$, that is, that it is not known whether Bill went to the mountains. In this case, three situations arise.

(1) If $A=-1$, $P=L(-1, 0)=0$. In this case, it is not known whether the compound proposition $p$ is true.

(2) If $A=0$, then $P=L(0, 0)=0$. Again it is not known whether the compound proposition P is true.

(3) If $A=+1$, then $P=+1$. In this case, the compound proposition $p$ is known to be true even though it is not known whether one of its component propositions, namely, proposition $b$ is true, or whether it is false.

*Law of Conjunction.*—When a compound proposition $p$ represents the logical sum of a series of propositions $a$, $b$, $c$, . . ., the compound proposition may be written $$p=abc\ldots$$

In this case, the truth value P of the proposition $p$ is the smallest of the truth values A, B, C, . . . of the propositions $a$, $b$, $c$, . . . . Thus, $$P=S(A, B, C, \ldots)$$

where the expression S indicates that the smallest of the values of the terms of parentheses is to be taken. As an example of the application of this law assume that $$p=ab$$

where $a$=it rained yesterday
$b$=Bill went to the mountains

Then the proposition $p$ is $p$=it rained yesterday and Bill went to the mountains Again nine possible examples exists of which the following are typical.

If $A=-1$, then $P=-1$, irrespective of the value of B. That is, if it did not rain yesterday, then the compound proposition $p$ is false, irrespective of whether it is known whether the statement "Bill went to the mountains" is true or false.

If $A=-1$ and $B=-1$, this means that it is known that it did not rain yesterday and it is known that Bill did not go to the mountains. In this case, $P=-1$. In other words, under these circumstances, the compound proposition $p$ is known to be false.

Now suppose that we consider again a situation in which only partial information is available. Let it be assumed that $B=0$, that is, that it is not known whether Bill went to the mountains. In this case, too, three situations arise.

(1) If $A=-1$, $P=S(-1, 0)=-1$. In this case it is known that the compound proposition is false.

(2) If $A=0$, then $P=S(0, 0)=0$. In this case, it is not known whether the compound proposition P is true or whether it is false.

(3) If $A=+1$, then $P=S(+1, 0)=0$. In this case, even though it is known that the proposition $a$ is true, it is not true whether the compound proposition is true, or whether it is false.

Both the law of inclusive disjunction and the law of conjunction set forth above are well known in the field of multi-valued logic. These laws are discussed in the various references to multi-valued logic cited above. However, various three-valued logics employ different laws of negation. The law of negation employed in this logic is described below.

*Law of Negation.*—The law of negation used here is that which is called by Reichenbach diammetrical negation. In this law of negation, the negate $p'$ of a proposition $p$ has a truth value which is equal and opposite to the truth value of the proposition $p$. That is, if $T(p)=P=+1$, then $T(p')=P'=-1$
if $T(p)=P=0$, then $T(p')=P'=0$
if $T(p)=P=-1$, then $T(p)=P'=+1$ To illustrate this law of negation, assume that $b$=Bill went to the mountains In this case, we have $b'$=Bill did not go to the mountains Here it can be readily seen that if $B=+1$, then $B'=-1$, and also that if $B=-1$, then $B'=+1$. In other words, if either proposition $p$ or $p'$ is true, the other is false. Likewise, if either $b$ or $b'$ is false, the other is true. It should also be noted that if $B=0$, then $B'=0$. In the latter case, the law of diametrical negation means that if it is true that it is not known whether Bill went to the mountains, then it is also true that it is not known whether Bill did not go to the mountains.

It is significant that the notation and interpretation of symbols employed herein represents a departure from notation and interpretations previously employed. Furthermore, it is important to note that some of the concepts that underlies the three-valued logic described above and the notation employed, are very different from those employed in Boolean algebra and in some other three-valued logics.

The law of negation described above must also be carefully distinguished from other laws of negation which are sometimes used in multi-valued logic, such as cyclic negation of certain algebra introduced by Post and so-called complete negation (Reichenbach, p. 151 supra).

*Law of Implication.*—When a proposition $p$ implies a proposition $q$, it is conventional to represent this implication relationship by the equation $$p \supset q$$

Various rules have been adopted by various logicians to determine whether this relationship is true or false or something else according to the truth value of the propositions $p$ and $q$. See for example the works of Post, Lewis and Langford and Reichenbach mentioned above. And see also the discussion by Rosser "On the Many-Valued Logics," American Journal of Physics, Vol. 9, August 1941, pp. 207–212.

It is believed to be very important to have a simple and reliable law of implication available in the design, construction and use of logic machines which are applicable to the analysis of data which may be unknown, incomplete, or inconsistent at the commencement of the problem.

I have found that the laws of implication set forth in those works are unsatisfactory for the solution of everyday problems of logic that are based upon a three-valued logic of this invention. However, I have discovered that useful results can be attained if it is assumed that $p$ implies $q$ if and only if $$P \leqslant Q$$

According to this law of implication, $p$ implies $q$ if and only if the truth value of $p$ is less than or equal to the truth value of $q$.

The plausibility of the law of implication employed here can be recognized by the consideration of a simple problem in which $p$=Socrates is a man
$q$=Socrates is mortal These two propositions will be recognized as being the first and last terms of a well-known syllogism. If $p$ implies $q$, then certainly if $Q=-1$, it follows that $P=-1$. In other words, if it is known that Socrates is not mortal, then it is known that Socrates is not a man. Furthermore, if $P=+1$ and $Q=-1$, then $p$ does not imply $q$. That is, $$T(p \supset q)=-1$$

Another interesting example occurs where it is not known whether Socrates is a man, that is, where $P=0$. According to the law of implication set forth above, we must have $Q \geqslant 0$. That is, the conclusion $Q=1$ cannot be drawn. Stated differently, if it is not known whether Socrates is a man, then it is not known that Socrates is not mortal. For if it were known that Socrates is not mortal, then by the law of implication, it would follow that Socrates is not a man. But this contradicts the assumption that it is not known whether Socrates is mortal.

Similarly, if it is not known whether Socrates is mortal, that is, if $Q=0$, then it follows that $P \leqslant 0$ and in this particular case we cannot say truthfully that Socrates is a man, for if it were true that Socrates is a man we would have $Q=+1$ which is inconsistent with the assumption that $Q=0$. If we assume that Socrates exists, then it could be shown by other reasoning that Socrates is not a man, but if Socrates does not exist, the proposition $p$ could have the truth value 0.

While the foregoing explanation seems very obtruse and far from down-to-earth, the practical utility of employing the law of implication set forth here, will appear from a consideration of various applications of the inventions set forth hereinafter.

Though the invention is described herein with particular reference to the use of 1, 0 and −1 as the three truth values, it will be understood that the invention may utilize other truth values without even modifying any of the laws set forth above. Among the sets of truth values which can be employed is the set 11, 01, 00 and the set 1, ½, 0. In the case of the law of negation, these truth values are interrelated with a proposition $p$ and its negate $p'$ by the following table:

*Table II*

| Truth Values | | Numerical Equivalents | | | | | |
|---|---|---|---|---|---|---|---|
| P | P' | P | P' | P | P' | P | P' |
| T | F | +1 | −1 | 1 | 0 | 11 | 00 |
| N | N | 0 | 0 | ½ | ½ | 01 | 01 |
| F | T | −1 | +1 | 0 | 1 | 00 | 11 |

The set of two-digit binary numbers 11, 01 and 00 is particularly interesting since it may be employed to perform logical operations in accordance with the laws of disjunction and conjunction by following simple arithmetic rules. However, these rules will not be discussed here. It is interesting to note that in all three cases the negate of a proposition having any one of the highest numerical truth values in any of the columns of Table II has a truth value equal to the lowest; and the negate of a proposition having the lowest has a truth value equal to the highest; but the negate of a proposition having a truth value of the intermediate value is also of intermediate value.

It is important to note that in the three-valued logic many of the laws of two-valued logic apply, namely, among others, the laws of commutation, the laws of distribution, De Morgan's laws and the law of contraposition. However, since the law of excluded middle does not apply in three-valued logic, it is necessary to take this fact into account whenever equations are manipulated or interpreted in accordance with the three-valued logic. Without explaining the basis for the conclusion, it can be shown that the following additional laws are needed in order to manipulate propositional equations properly in the three-valued logic.

$$p+p'=u(p)$$
$$pp'=z(p)$$

For convenience the function $u(p)$ is called the unit function and the function $z(p)$ the zero function. Their truth values are $U(p)$ and $Z(p)$ respectively. In these two equations the propositions $p$ and $p'$ are the negates of one another. The truth values of the unit function $U(p)=T$ when the truth value of either $p$ or $p'$ is T or F, and $U(p)=N$ if the truth value of the proposition $p$ is N. Also, $Z(p)=F$ if the truth value of $p$ is either T or F, and $Z(p)=N$ if the truth value of the proposition $p$ is N. The exact numerical values that are to be assigned to the truth values of the unit functions are those set forth in Table II, depending upon the numerical equivalent being used.

For purposes simplicity, the logic system the employs the laws of disjunction, conjunction, and negation employed herein, is referred to as a linear-scale three-valued logic. This term distinguishes the logic employed here clearly from any logic employing a cyclic rule of negation. The invention is described herein primarily with particular reference to such a linear-scale three-valued logic system. However, it will be understood that many of its features are also applicable to multi-valued logic systems that employ more than three truth values and some of its features apply where other rules of negation are employed and that some are even applicable to two-valued logic. Furthermore, whereas various embodiments of the invention described herein depend upon the specific laws of negation and implication described above, many features of the invention are applicable to multi-valued logic systems that employ other laws of negation and implication.

Having the foregoing in mind, the principal object of this invention is to provide a logic machine which can be used in determining the truth value of propositional equations in multi-valued logic. More particularly, the principal object of this invention is to provide a logic machine for determining the truth value of a compound logical proposition on a linear scale when the truth values of the component propositions are designated on that scale.

Another object of this invention is to provide a logic machine which is based upon the use of single-digit numbers for representing a plurality of truth values of a multi-valued logic having a linear truth-value scale.

Another object of this invention is to provide logic units for performing various operations of conjunction, disjunction negation, implication and the like, in multi-valued logic.

Another object of the invention is to provide a logic machine in which the values of propositions may be manually set at any one of at least three values of components of a compound proposition and in which the truth value of the compound proposition may be correctly and visually indicated on that scale.

Another object of the invention is to provide a logic machine which may be manually operated to feed in the truth-values of individual propositions that will enable the user to visualize instantly the effect of taking into account individual facts as the analysis proceeds.

Still another object of this invention is to provide a logic machine of an electronic character which is of simple construction and which makes use of commonly available AND and OR gating units as the logic units, but which are connected and arranged so as to operate on the principles of multi-valued linear-scale logic.

Another object of the invention is to provide a logic machine for detecting inconsistencies of results obtained by applying different compound propositions to the same set of facts.

Another object of the invention is to provide an electrical logic machine that makes use of manual switches for applying the truth values of various propositions stated as premises and visual indicators for displaying the truth values of various propositions that form conclusions automatically derived from those premises.

Still another object is to provide a system for visually indicating the truth value of a proposition in a multi-valued logic system.

Still another object of the invention is to provide such an electrical logic machine in which two gaseous discharge tubes are employed to indicate truth and falsity respectively of a proposition according to the state of illumination of the lamps and lack of truth or falsity when the two lamps are in the same state.

In the simplest of the electrical logic machines hereinafter described, use is made of simple three-terminal switches with three-level D.C. voltage sources to provide the signals employed in the solution of logic problems in the three-valued linear-scale logic.

Though the invention is described with reference to particular sets of numerical equivalents of three truth values T, N and F, it will be understood that it may be modified to employ other numerical equivalents of the truth values. Furthermore, though the invention is described primarily with particular reference to the use of D.C. signals as manifestations of truth values that are applied simultaneously to logic units to represent the truth values of various propositions, it will be understood that the invention may also be applied to systems in which truth values are manifested by other types of signals such as by means of pulses. Furthermore, if the truth value manifestations are in the form of pulses, the manifestations may be in the form of simultaneously existing pulses or in the form of sequences of pulses. Furthermore, even though the invention is described primarily with reference to the use of logic units that employ switches, resistors, diodes, triodes, and neon tubes, it will be understood that the invention may also make use of other types of electrical components that are adapted to produce signals or states of different magnitudes, phases, frequencies, or durations to represent truth values.

The foregoing and other objects of this invention and its construction and method of operation will be clear from the following description of several embodiments of the invention taken in connection with the accompanying drawings in which.

Figure 4A:
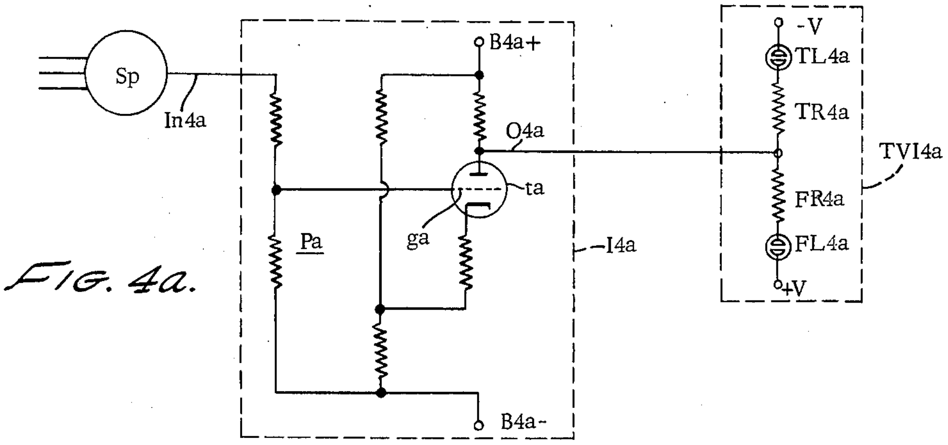
Figure 4B:
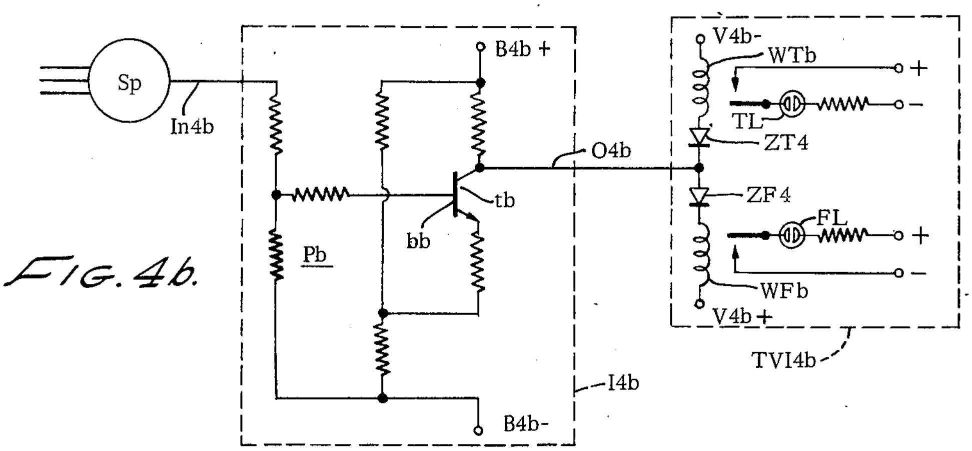
Figure 5A:
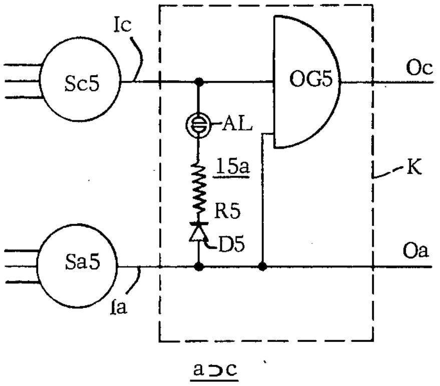
Figure 5B:
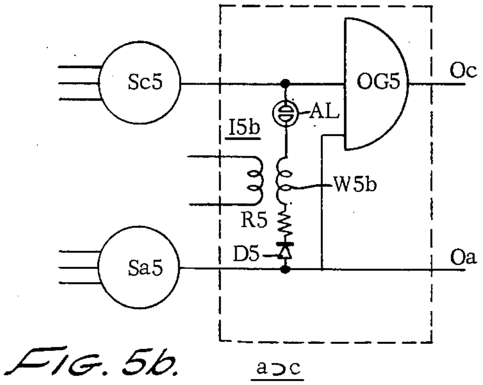
Figure 6:
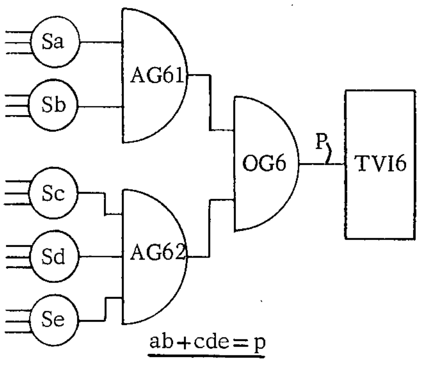
Figure 10A:
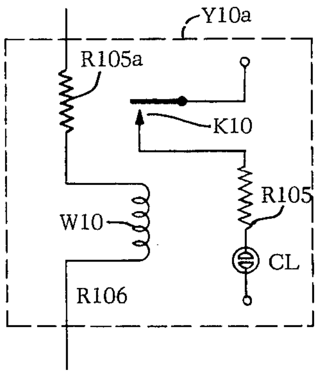
Figure 6:
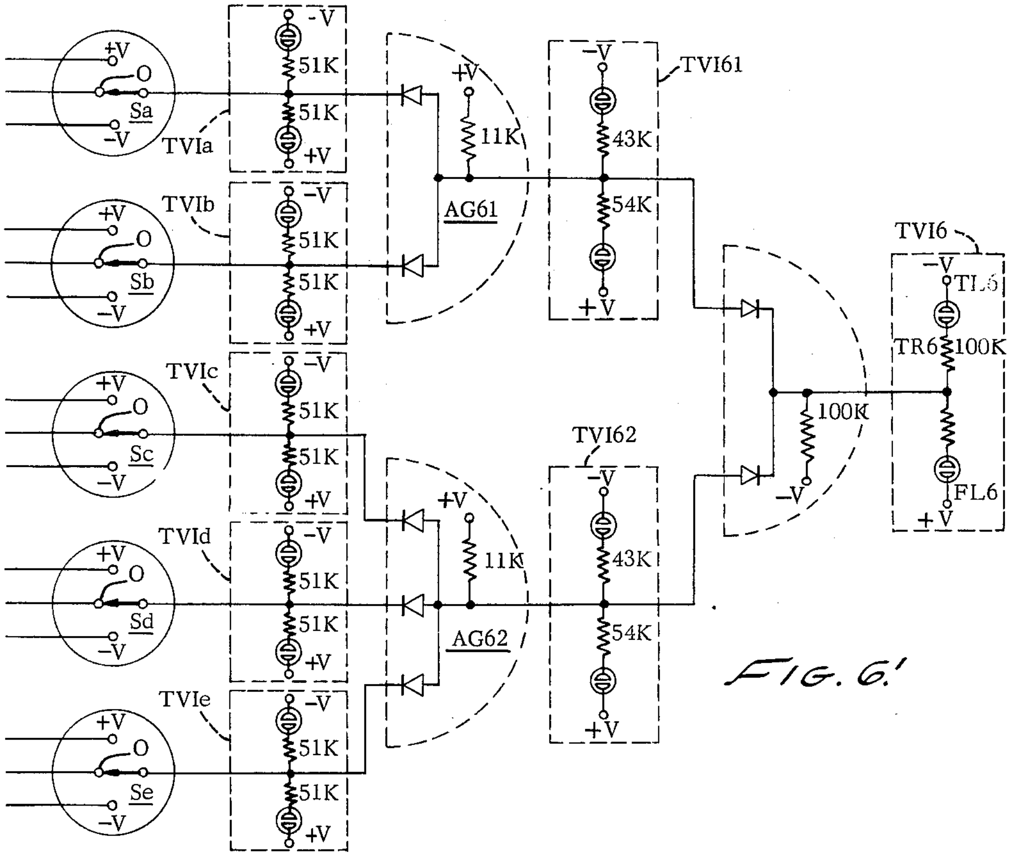
Figure 10:
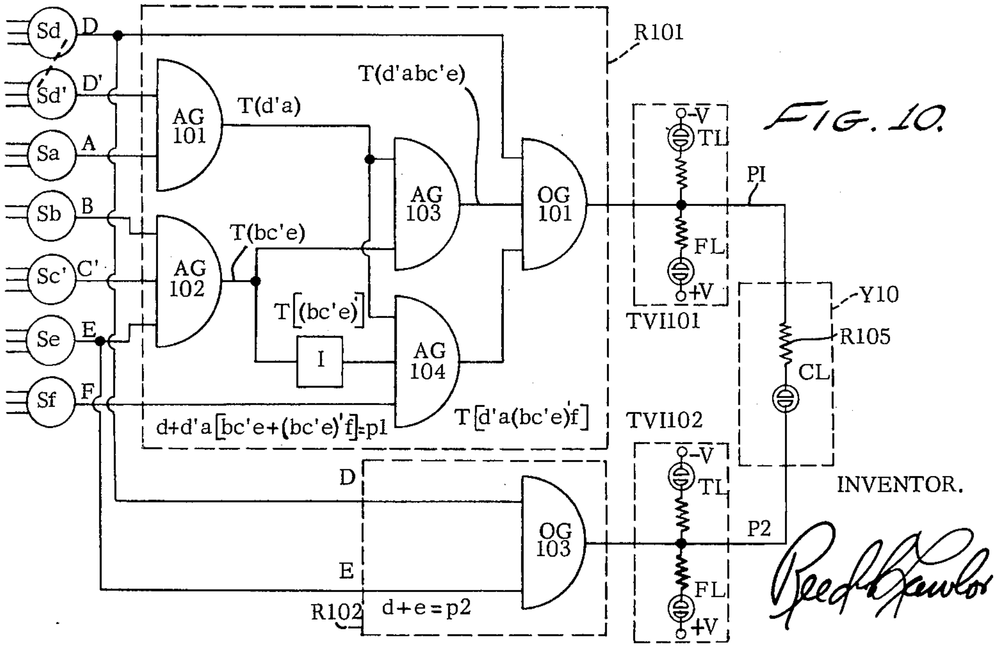
Figure 13:
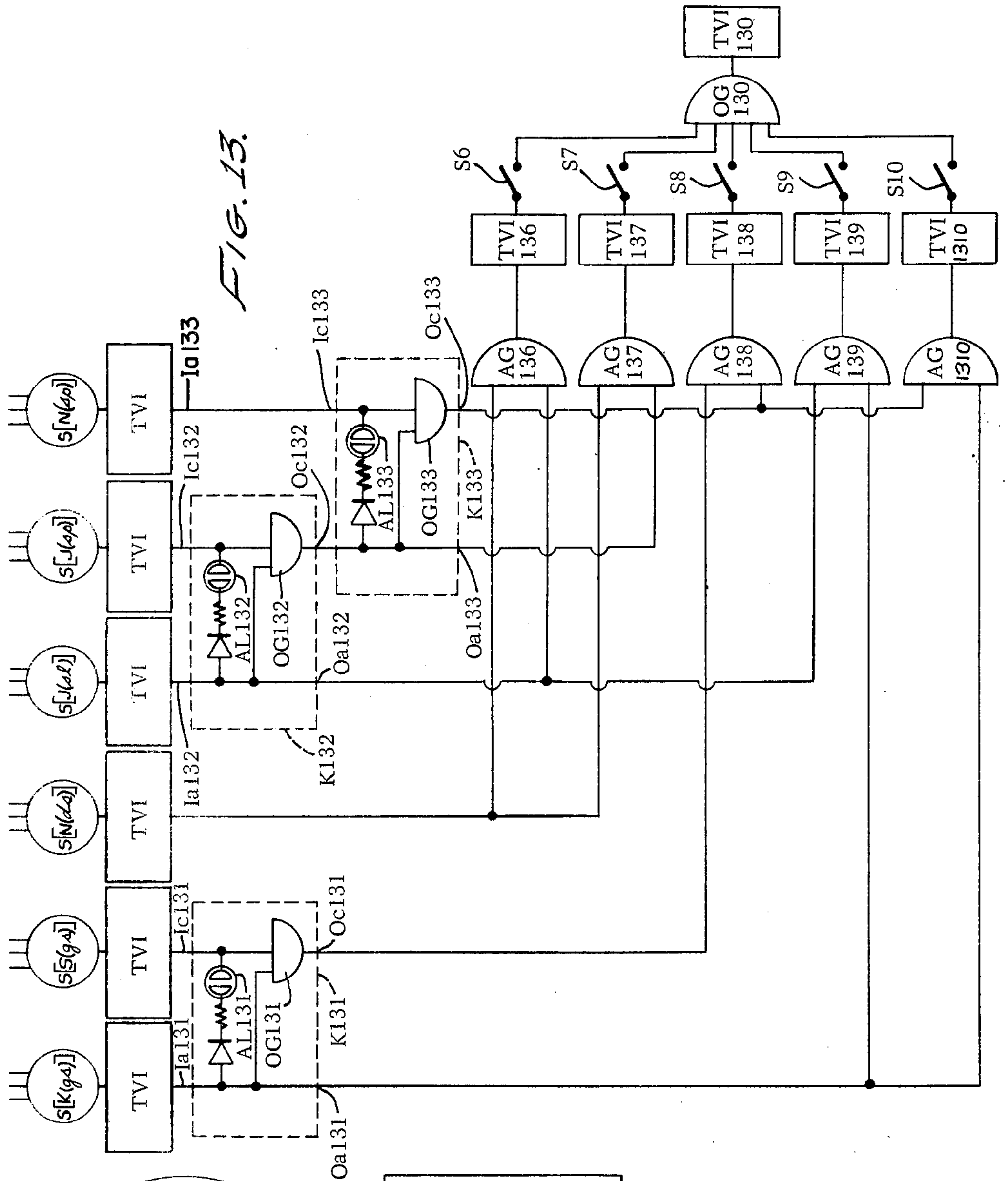
Figure 16:
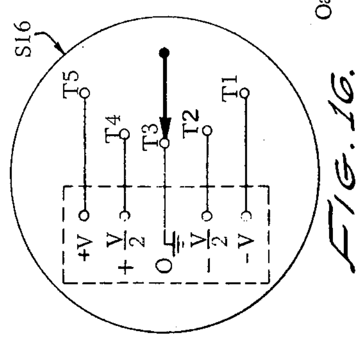
Figure 17:
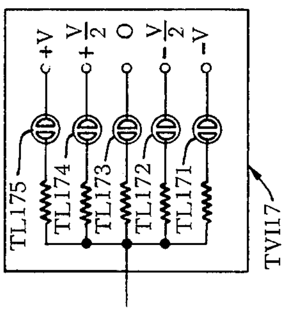
Figure 14:
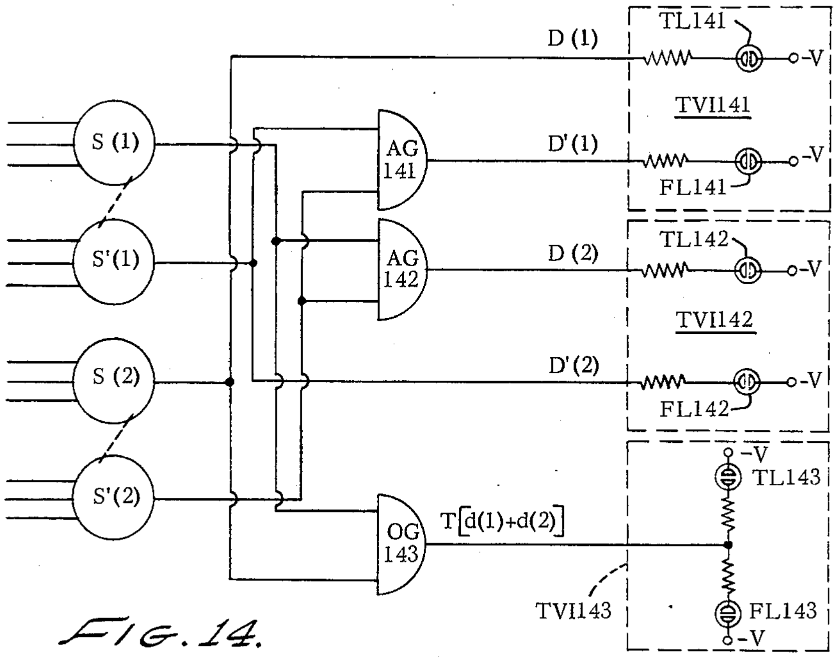
Figure 15:
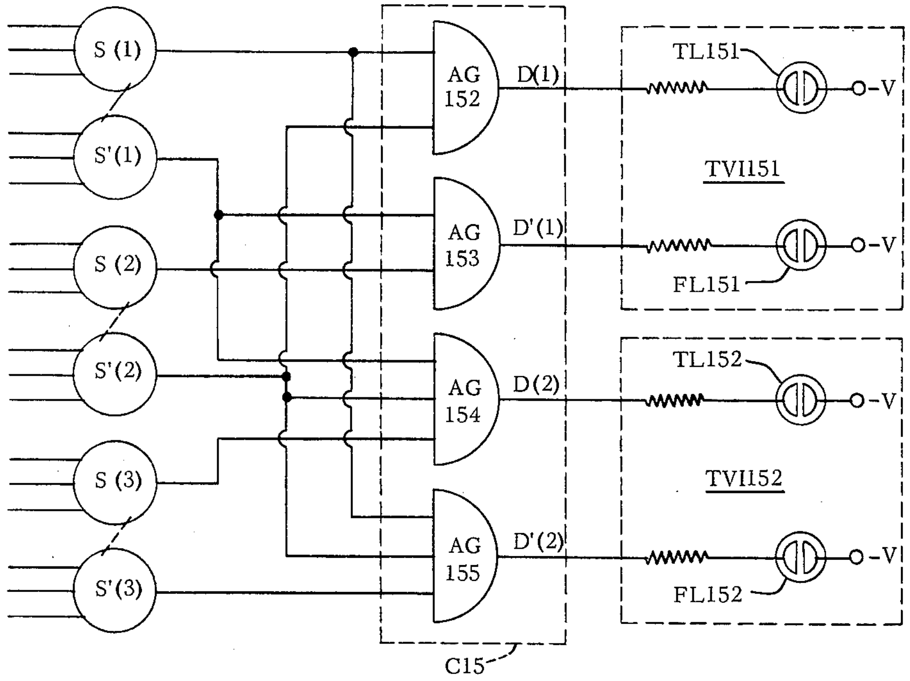

FIG. 4*a* is a schematic diagram of a negator or inverter;

FIG. 4*b* is a schematic diagram of an alternative form of negator or inverter;

FIGS. 5*a* and 5*b* are schematic diagrams of different forms of implicators or implication circuits;

FIGS. 6, 7, 8 and 9 are block diagrams of various logic systems for determining the truth values of various compound propositions;

FIG. 6' is a detailed wiring diagram of a logic system of the type shown in FIG. 6 showing circuit constants;

FIG. 10 is a schematic diagram of a logic system that employs two units operated in accordance with different rules, together with means for indicating when the rules produce inconsistent results;

FIGS. 11*a* and 11*b* are block diagrams of different forms of logic systems designed to reconcile the results attainable by the rules employed in the circuit of FIG. 10;

FIGS. 12 and 13 are block diagrams of circuits illustrating how this invention may be applied to determine questions of patent infringement;

FIGS. 14 and 15 are schematic diagrams of circuits illustrating how the invention may be applied to problems in medical diagnosis;

FIG. 16 is a schematic diagram of a source unit applicable to a five-valued logic system; and FIG. 17 is a schematic diagram of a truth value indicator applicable to a five-valued logic.

Referring to the drawings, and particularly to FIGS. 1–5, 16 and 17, there are illustrated various logic units that are used in the practice of this invention, while in FIGS. 6 to 15 there are illustrated various circuits employing such units for solving various compound propositional equations. The various logic circuits utilize multi-level source units for supplying signals that manifest any one of at least three truth values of given propositions, interconnected OR gates and AND gates for producing signals that are manifestations of the truth values of propositions that represent logical disjunctions and conjunctions of the given propositions, and multi-level truth-value indicators that are connected at various points for indicating the truth values of various propositions and combinations of propositions whose truth values are manifested at those points. As used herein, the term "multi-values" refers to three or more when applied either to logic or to signal levels that manifest truth values in such a logic. Though the invention is described hereinafter primarily with reference to three-valued logic employing three-level logic units, it will be understood that it may even be employed for solving problems in logic having a greater number of truth values.

THREE-LEVEL INPUT SOURCES

In the various systems described herein three-level input sources are employed to produce manifestations of the truth values of various individual propositions and an output circuit is employed which indicates the manifestation of the truth value of a compound proposition formed by the first mentioned individual propositions. In these specific embodiments of the invention described herein, the manifestations are in the form of D.C. voltages that have any one of three different magnitudes or levels. More particularly, in the specific three-valued logic systems described a voltage +V corresponds to a truth value +1, a voltage of 0 corresponds to a truth value 0, and a voltage −V corresponds to a truth value −1. Thus, a linear scale of D.C. voltages is employed as manifestations of the three truth values that are on a linear scale, and the voltages are arranged in the same sequence or order algebraically as the truth values. However, it will be understood that other correlations of D.C. voltages may be employed as manifestations of the truth values. The high level of voltage corresponds to a high level truth value of +1, that is, to known truth of a proposition. The medium level of voltage corresponds to a medium level truth value of 0, or unknown truth or falsity of a proposition. And the low value level corresponds to a low level truth value of −1, or known falsity of the proposition. While in the forms of the inventions described herein the levels of the manifestation corresponds to the amplitudes of the D.C. voltages produced, these levels may correspond to other amplitudes; and other types of discretely different signals may be employed to manifest the truth values of different levels.

Figure 1:
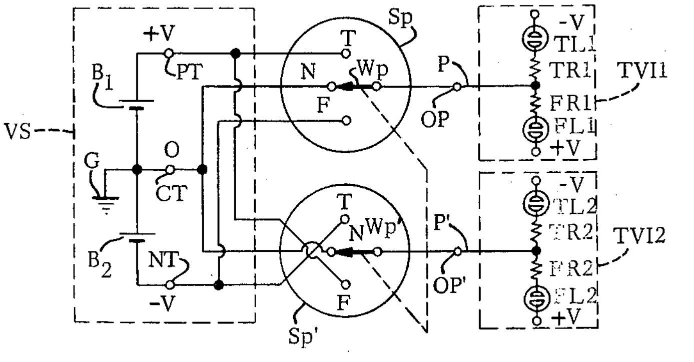
FIG. 1 is a schematic diagram of a source of signals or manifestations of truth values of a proposition $p$ and its negate $p'$.

In FIG. 1 there is illustrated a pair of coupled multi-level source units S$p$ and S$p'$, consisting of a two-ganged, three-position switch. The source units S$p$ and S$p'$ produce signals or manifestations representing the truth values P and P' of the proposition $p$ at their respective outputs by manipulation of ganged switches W$p$ and W$p'$. A constant, or regulated, center-tapped power supply VS here represented by two batteries $B_1$ and $B_2$ has three terminals, a positive terminal PT at which the voltage +V appears, a neutral, or center, terminal CT at which a 0 (zero) voltage appears, and a negative terminal NT at which the voltage −V appears. The voltage difference across each half of the voltage supply is the same. The center terminal is connected to ground G. In some cases hereinafter the positive and negative terminals PT and NT are indicated by the voltages +V and −V that they supply. For best results the two halves of the voltage supply are in the form of independently regulated electronic voltage supplies.

The source S$p$ has three taps or stationary contacts. The upper, or truth, tap is connected to the positive terminal of a D.C. power supply section $B_1$. The center, or neutral, tap is connected to ground G. And the lower, or falsity, tap is connected to the negative terminal of a second D.C. power supply section $B_2$. The source S$p'$ likewise has three taps. The upper or truth tap is connected to the negative end of the D.C. power supply section $B_2$. The center, or neutral, tap is connected to ground G. The lower, or falsity, tap is connected to the positive terminal of the first D.C. power supply $B_1$. The two D.C. supplies $B_1$ and $B_2$ are of equal magnitude and are connected in series on opposite sides of ground G to provide a three terminal multi-level D.C. voltage supply VS as indicated in FIG. 1.

When either switch arm W$p$ or W$p'$ is in its central or neutral position, a zero voltage representing a truth value of 0 appears at the outputs O$p$ and O$p'$ of the corresponding signal source S$p$ and S$p'$. When switch arms W$p$ and W$p'$ are in their upper positions, a positive voltage representing a truth value of +1 of the proposition $p$ appears at the output O$p$, and a negative voltage representing a truth value of −1 of the proposition $p'$ appears at the output O$p'$. When switch arms W$p$ and W$p'$ are in their lower positions, a negative voltage representing a truth value of −1 of the proposition $p$ appears at the output O$p$, and a positive voltage representing a truth value of +1 of the proposition $p'$ appears at the output O$p'$.

Using the interpretation of truth values explained hereinabove, when the two switches W$p$ and W$p'$ are in their upper or true positions, the proposition $p$ is known to be true and the proposition $p'$ is known to be false; when the two switches are in the lower or false position, the proposition $p$ is known to be false and the proposition $p'$ is known to be true; but when the switches are in their central or neutral or "don't know" position, it is not known whether the propositions $p$ or $p'$ are true or false. In other words, when employing these source units, the switch arms are set in the upper positions when the corresponding proposition $p$ is known to be true, in the lower position when it is known to be false, and in the central position when it is not known whether the proposition is true or whether it is false. In all cases the truth value P appears at the output terminal OP and the truth value P' at the output terminal OP'. In both cases the position in which the switch arms are set are determined by the truth value of the proposition $p$, but the truth values of each of the propositions $p$ and $p'$ are manifested at the outputs of the two sources S$p$ and S$p'$ respectively.

In practice, a system of truth value sources often uses many source units like S$p$ and many like S$p'$ and sometimes pairs of ganged sources that represent two mutual negates as in FIG. 1. In the specific arrangement shown in FIG. 1, truth-value indicators TVI1 and TVI2 are connected to the outputs OP and OP' of the sources S$p$ and S$p'$. Each of these truth-value indicators includes a corresponding true lamp TL and a corresponding false lamp FL. Each true lamp TL is connected in series with an upper ballast resistor TR between the output terminal OP or OP', as the case may be, and the negative terminal −V of the power supply VS. Each false lamp FL is connected in series with a lower ballast resistor FR between the output terminal OP or OP', as the case may be, and the positive terminal +V of the voltage supply VS. The resistances of the ballast resistors TR and FR are large compared with the internal resistance of the power supply VS. For convenience, both true lamps that indicate a manifestation of a known-to-be-true truth value and false lamps that indicate a manifestation of a known-to-be-false truth value are sometimes referred to hereinafter as truth-value lamps.

The truth-value lamps TL and FL have ignition voltages greater than V but less than 2V. They also have sustaining voltages greater than V. Accordingly, with this arrangement, when a voltage of +V appears at either output OP or OP', the corresponding true lamp TL is "on," and the corresponding false lamp FL is "off," and when a voltage of −V appears at either output OP or OP', the corresponding false lamp FL is "on" and the corresponding truth lamp TL is "off," and when a 0 voltage appears at either output OP or OP', none of the true lamps and none of the false lamps are "on." With this specific arrangement, then, both the truth-value indicators TVI1 and TVI2 indicate the truth value of the proposition $p$ irrespective of whether it is supplied with a truth-value manifestation from the source S$p$ or from the source S$p'$. These truth-value indicators TVI1 are some times referred to hereinafter as source-type truth-value indicators. To indicate the truth value of proposition $p'$ the polarities of the voltages of the terminals to which the true lamp TL and false lamp FL are connected are interchanged.

THREE-LEVEL LOGICAL DISJUNCTION CIRCUIT

Figure 2:
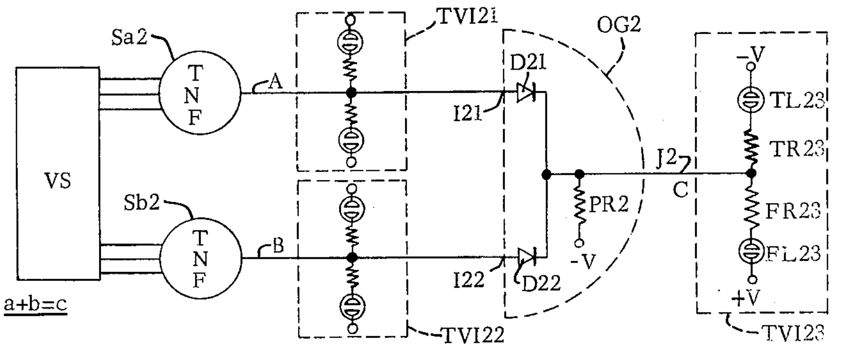
FIG. 2 is a schematic diagram of a circuit employed for determining the logical sum of a compound proposition.

In FIG. 2 there is illustrated a circuit for determining the truth value of a logical disjunction of two propositions represented by the equation $$a+b=c \quad (1)$$

This circuit includes a diode OR gate OG2 having two inputs I21 and I22 and a single output J2, two three-level sources S$a$2 and S$b$2, a regulated voltage supply VS, two input truth-value indicators TVI21 and TVI22, and a three-level truth-value indicator TVI23. The two inputs I21 and I22 of the OR gate are connected to the outputs of two three-level signal sources S$a$2 and S$b$2 respectively, which are connected to the common power supply VS. The two input truth-value indicators TVI21 and TVI22 are connected at the outputs of the two sources S$a$2 and S$b$2 and hence to the two gate inputs I21 and I22. The output J2 is connected to the truth-value indicator TVI23.

The manifestations of the truth values of the propositions $a$ and $b$ are applied to the inputs I21 and I22 and the manifestation of the truth value of the compound proposition $c$ corresponding to any pair of truth values of the propositions $a$ and $b$ appear at the output junction J2. The input manifestations are indicated by two truth-value indicators TVI21 and TVI22, and the output manifestation is indicated by the truth-value indictor TVI23.

The OR gate OG comprises two diodes D21 and D22 which are connected between the respective inputs I21 and I22 and the output J2. A power-supply ballast resistor PR2 is connected to the output J2 and the negative terminal −V of the voltage supply VS. The anodes of the diodes D21 and D22 are connected to the inputs I21 and I22 respectively, while their cathodes are connected to the output junction J2.

The truth-value indicator TVI23 includes a true lamp TL23 and a false lamp FL23 in the form of gaseous discharge tubes such as neon lamps. The true lamp TL23 and a balance resistor TR23 are connected in series between the output J2 of the OR gate OG and the negative terminal −V of the power supply VS. The false lamp FL23 and a balance resistor FR23 is connected between the output J2 of the OR gate OG and the positive terminal +V of the power supply VS. Each of the positive and negative voltages +V and −V supplied by the power supply VS is less than the sustaining voltages of the neon lamps of the unit, but their sum is greater than the ignition voltages of the lamps. Under these circumstances, the "on" and "off" conditions of the two indicator lamps TL23 and FL23 depend upon the truth values A and B of the propositions $a$ and $b$ in the manner set forth in Table F2. By employing an upper balance resistor TR23 that has a resistance equal to that of the ballast resistor PR2 plus that of the lower balance resistor FR23, current carried by the true lamp TL23 when energized equals the current carried by the false lamp FL23 when energized. When resistor FR23 is omitted, such equality of currents and hence illumination by the lamps is achieved by making the resistance of the balance resistor TR23 equal to that of the ballast resistor PR23. The truth-value indicator TVI23 at the output of the OR gate of FIG. 2 is sometimes referred to hereinafter as an OR-type truth-value indicator.

Referring to Table F2, it will be noted that the output truth lamp TL23 is "on" and the output false lamp FL23 is "off" when and only when the truth value C of the logical disjunction $c$ is 1. It will also be noted that the output false lamp FL23 is "on" and the output true lamp TL23 is "off" when and only when the logical disjunction has a truth value −1. It will also be noted that when and only when the logical disjunction has a truth value of 0, both output indicator lamps TL23 and FL23 are "off." In other words, when the output true lamp TL23 is "on,"

*Table F2*

| A | B | C | TL | FL |
|---|---|---|---|---|
| 1 | 1 | 1 | On | Off |
| 1 | 0 | 1 | On | Off |
| 1 | −1 | 1 | On | Off |
| 0 | 1 | 1 | On | Off |
| 0 | 0 | 0 | Off | Off |
| 0 | −1 | 0 | Off | Off |
| −1 | 1 | 1 | On | Off |
| −1 | 0 | 0 | Off | Off |
| −1 | −1 | −1 | Off | On |

the logical disjunction $a+b=c$ is known to be true. When the output false lamp FL is on, the logical disjunction $a+b=c$ is known to be false. And when neither the output truth lamp TL nor the output false lamp FL is "on,"

it is not known whether the logical disjunction $a+b=c$ is true or whether it is false. When additional terms are present in the logical sum, an additional source unit is employed to supply truth-value manifestations corresponding to each such proposition, and an additional diode is connected between an additional input of the OR gate OG and the output. In such case, the truth lamp TL23 will be "on" if and only if at least one of the propositions is true and the false lamp FL23 will be "on" if and only if all of the propositions are false and neither the truth lamp TL23 nor the false lamp FL23 will be "on" if none of the propositions is known to be true, and if at least one proposition is not known to be true or false.

THREE-LEVEL LOGICAL CONJUNCTION CIRCUIT

Figure 3:
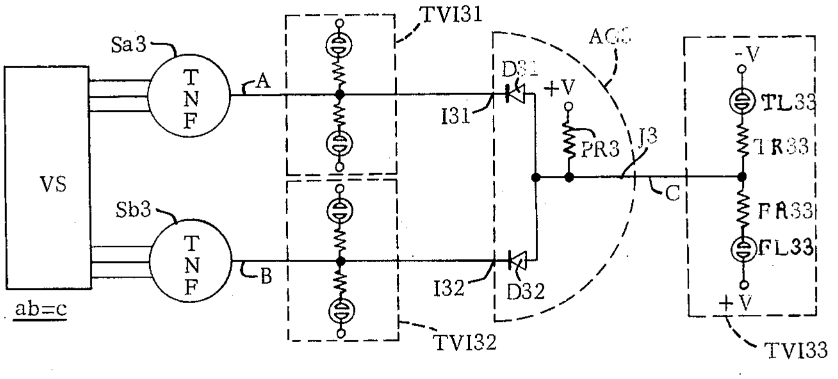
FIG. 3 is a schematic diagram of a circuit employed for determining the logical product of a compound proposition.

In FIG. 3 there is illustrated a circuit for determining the truth value of a logical conjunction of two propositions represented by the equation.

$$ab=c \quad (2)$$

This circuit includes a diode AND gate AG3 having two inputs I31 and I32 and a single output J3, two three-level sources S*a*3 and S*b*3, a common regulated voltage supply VS, two input truth-value indicators TVI31 and TVI32 and a three-level truth value indicator TVI33. The two inputs I31 and I32 of the AND gate are connected to the outputs of two three-level signal sources S*a*3 and S*b*3 respectively, which are connected to the common power supply VS. The two input truth-value indicators TVI31 and TVI32 are connected at the outputs of the two sources S*a*3 and S*b*3 and hence to the two gate inputs I31 and I32. The output J3 is connected to the truth-value indicator TVI33.

The manifestations of the truth values of the propositions *a* and *b* are applied to the inputs I31 and I32 and the manifestations of the truth value of the compound proposition *c* corresponding to any predetermined set of truth values of the propositions *a* and *b* appear at the output junction J3. The input manifestations are indicated by the two truth-value indicators TVI31 and TVI32, and the output manifestation is indicated by the truth-value indicator TVI33.

The AND gate AG3 comprises two diodes D31 and D32 which are connected between the respective inputs I31 and I32 and the output J3. A power-supply ballast resistor PR3 is connected between the output J3 and the positive terminal +V of the voltage supply VS. The cathodes of the diodes D31 and D32 are connected to the inputs I31 and I32 respectively, while their anodes are connected to the output junction J3.

The truth-value indicator TVI33 includes a true lamp TL33 and a false lamp FL33 in the form of gaseous discharge tubes such as neon lamps. The true lamp TL33 and a balance resistor TR33 are connected in series between the output J3 of the AND gate AG3 and the negative terminal —V of the power supply VS. The false lamp FL33 and a balance resistor FR33 are connected between the output J3 of the AND gate AG3 and the positive terminal +V of the power supply VS. Each of the positive and negative voltages +V and —V supplied by the power supply VS is less than the sustaining voltages of the neon lamps, but their algebraic difference 2V is greater than the ignition voltages of the lamps. Under these circumstances, the "on" and "off" conditions of the two indicator lamps TL33 and FL33 depend upon the truth values A and B of the propositions *a* and *b* in the manner set forth in Table F3. By employing a lower balance resistor FR33 that has a resistance equal to that of the ballast resistor PR3 plus that of the upper balance resistor TR33, current carried by the true lamp TL33 when energized equals the current carried by the false lamp FL33 when energized. When resistor TR33 is omitted, such equality of currents and hence illumination by the lamps is achieved by making the resistance of the balance resistor FR33 equal to that of the ballast resistor PR3. The truth-value indicator of FIG. 3 is sometimes referred to hereinafter as an AND-type truth-value indicator.

*Table F3*

| A | B | C | TL | FL |
|---|---|---|---|---|
| 1 | 1 | 1 | On | Off |
| 1 | 0 | 0 | Off | Off |
| 1 | −1 | −1 | Off | On |
| 0 | 1 | 0 | Off | Off |
| 0 | 0 | 0 | Off | Off |
| 0 | −1 | −1 | Off | On |
| −1 | 1 | −1 | Off | On |
| −1 | 0 | −1 | Off | On |
| −1 | −1 | −1 | Off | On |

Referring to Table F3, it will be noted that the truth lamp TL33 is "on" and that the false lamp is "off" when and only when the truth value C of the logical conjunction *c* is 1. It will also be noted that the false lamp FL33 is "on" and the true lamp TL33 is "off" when and only when the logical conjunction has a truth value of —1. It will also be noted that when and only when the logical conjunction has a truth value of 0, both indicator lamps TL33 and FL33 are "off." In other words, when the true lamp TL33 is "on," the logical conjunction $ab=c$ is known to be true. When the false lamp FL33 is "on," the logical conjunction $ab=c$ is known to be false. And when neither the true lamp TL33 nor the false lamp FL33 is "on," it is not known whether the logical conjunction $ab=c$ is true or whether it is false.

THREE-LEVEL LOGICAL NEGATION CIRCUITS

In order to negate a manifestation of a truth value in the linear-scale three-valued logic of this invention, a negator or inverter is employed which produces at its output a signal equal in amplitude to a signal applied to its input but of the opposite sign. Two negators that may be employed for this purpose are illustrated in FIGS. 4*a* and 4*b* respectively. The negator of FIG. 4a includes a D.C. amplifier employing a triode, while the negator of FIG. 4*b* employs a D.C. amplifier utilizing a transistor.

In the negator I4*a* of FIG. 4*a*, voltages which have a magnitude in excess of those of the voltages V and —V of the power supply VS are applied to the terminals B4*a*+ and B4*a*— of the triode *ta*. By suitable choice of circuit constants, the gain of the amplifier forming the negator I4*a* is made equal to unity, and the output voltage is made 0 when the input voltage is 0. This result is achieved in part by applying the input voltage from the source S*p* to one end of a potential divider, the other end of which is connected to the negative terminal B4*a*—. With this arrangement, when a voltage S is applied to the input I*n*4*a*, the voltage applied to the control grid *ga* is $(I-X)(B4a-)+XV$ where X is the potential dividing ratio of the voltage divider P*a*. The ratio is made sufficiently small so that the voltage applied to the grid is always negative. Thus, for example, if $(B4a-)=50$, $x=0.4$, and $S=+50$, then $$\begin{aligned}(1-x)(B4a-)+xV &= -(1-0.4)50+(0.4)(50)\\ &= -30+20\\ &= -10\end{aligned}$$

Accordingly, a signal having the magnitude —V, 0 or +V appears at the output O4*a* when a voltage of +V, 0 or —V respectively is applied to the input I*n*4*a*. The voltage appearing at the output is impressed upon a truth-value indicator TVI4*a* of the general type hereinbefore described. In this case, as before, the values of the upper and lower ballast resistors TR4*a* and FR4*a* are adjusted so that when the true lamp TL4*a* and the false lamp FL4*a* are energized, they are about equally bright. In any event, as before, the true lamp ignites only when the output signal is +V, and the false lamp ignites only when the output signal is —V.

In the negator I4*b* of FIG. 4*b*, a transistor *tb* is employed together with a power supply that provides voltages at the terminals B4*b*+ and B4*b*−, which are too small to ignite neon tubes. In this case too, by suitable proportioning of circuit constants, the output signal appearing at the output O4*b* has a polarity which is opposite to the input signal supplied to the input I*n*4*b* from the source unit S*p* and the output signal is 0 when the input signal is 0. However, in view of the low value of the voltage normally employed to operate the transistor *tb*, the output voltage is smaller than the input voltage if the input voltage has the value +V or −V used to ignite a neon tube. In this case, too, the input signal is applied to one end of a potential divider P*b*, the other end of which is connected to the terminal B4*b*−. In this case, the potential dividing ratio is made sufficiently small so that when $S=+V$ the voltage applied to the base *bb* of the transistor is more negative than the output appearing at the output terminal O4*b*. In this case, because of the relatively low voltages appearing at the output, a different type of truth-value indicator TVI4*b* is employed.

More particularly, the truth-value indicator TVI4*b* utilizes two relays for operating a corresponding true lamp and a corresponding false lamp when the output signal is positive or negative, respectively, but neither lamp when the output signal is 0. The winding WT*b* of the relay that energizes the true lamp TL is connected in series with a zener diode ZT4 between the output O4*b* and a negative terminal V4*b*−. The winding WF*b* of the relay that energizes the false lamp FL is connected in series with a zener diode ZF4 between the output O4*b* and a positive terminal V4*b*+. The voltages applied to the two terminals V4*b*+ and V4*b*− are equal and opposite. The two zener diodes ZT4 and ZF4 have zener voltages which lie between the total voltage applied across the terminals V4*b*+ and V4*b*− and half that value, so that neither relay is energized when the output voltage is 0, but the true lamp relay is energized when the output voltage is positive and the false lamp relay is energized when the output voltage is negative.

While the relay-type truth indicator TVI4*b* has been described only in connection with the use of the transistor-type negator shown in FIG. 4*b*, it will be understood that relay-type truth-value indicators can be advantageously employed at the output of any logical circuit where the voltages are too small to ignite the gaseous discharge tubes that are utilized to indicate the manifestations of the truth-value signals appearing at the output.

In both the negator illustrated in FIG. 4*a* and the negator illustrated in FIG. 4*b*, the truth value of signals appearing at the output are related to the truth value of the signal applied to the input in accordance with the relations illustrated in Table F4.

*Table F4*

| P | P′ |
|---|---|
| +1 | −1 |
| 0 | 0 |
| −1 | +1 |

With such a negator the truth value manifestation P′ of the proposition *p*′ appearing at the output when a truth value manifestation P of a proposition *p* applied to its input are related by the following simple equation:

$$P'=-P \qquad (3)$$

This inverse relationship of truth-value manifestations exists even when the amplification is not unity, as in the case of the specific type of transistor-type inverter 14*b* described above.

IMPLICATION CIRCUITS

Implication circuits, or implicators, are illustrated in FIGS. 5*a* and 5*b* for producing an indication as to whether two assumed truth values of a pair of propositions are consistent with a law of implication known to hold between the propositions. More particularly, the implicator of FIG. 5*a* includes an OR gate OG5 and an inconsistency indicator 15*a* for indicating whether the implication relationship $$a \supset c$$

is satisfied by a particular set of truth values A and C of the propositions *a* and *c*. As explained hereinbefore, the implication Equation 4 is satisfied if and only if $$A \leqslant C \qquad (5)$$

The OR gate OG5 has a main output terminal O*c*, an auxiliary output terminal O*a*, and two input terminals I*c* and I*a* that serve as output and input terminals for the implication circuit. One of the input terminals, namely, input terminals I*a*5, is connected to the antecedent signal source S*a*5, while the other input terminal, namely input terminal I*c*5, is connected to the consequent signal source S*c*5. The main output terminal O*c* forms a consequent output terminal. The auxiliary output terminal O*a* is connected directly to the antecedent input terminal I*a* and may, in fact, coincide with it.

In the form of the invention illustrated in FIG. 5*a*, the inconsistency indicator I5 consists of a diode D5 and an inconsistency-indicating or alarm lamp AL and a current-limiting resistor R5 connected in series across the two inputs I*a*5 and I*c*5 in the direction indicated hereinafter. The anode of the diode D5 is connected to the output of the antecedent source S*a*5 and the cathode of the diode D5 is connected through the alarm lamp AL to the output of the consequent source S*c*5. The alarm lamp is one that has an ignition voltage less than V, the minimum difference of unequal voltages that can be applied to the two inputs I*a*5 and I*c*5, so that the alarm lamp AL will be ignited only when the truth value of the antecedent *a* is greater than the truth value of the consequent *c*. Furthermore, the sustaining voltage of the alarm lamp AL is greater than any difference that may exist between the actual voltages applied to the inputs I*a*5 and I*c*5 when they are nominally the same.

In FIG. 5*b*, there is illustrated an alternative form of implication circuit that is suitable to use when the alarm lamp AL has an ignition voltage greater than V. Such a circuit is particularly useful when the alarm lamp is to be of the same kind as the truth-value lamps of the truth-value indicators connected to other parts of the circuit, as described hereinafter, for example, in connection with FIG. 12.

In the modification of implicator shown in FIG. 5*b*, an A.C. lamp-bias voltage appearing across the secondary winding W5*b* of a transformer is connected in series with the diode D5 and the alarm lamp AL. This bias voltage is employed to trigger the ignition of the alarm lamp when the voltage across the alarm lamp AL is only V. The voltage thus applied by the secondary winding, though large enough to produce ignition when the voltage applied across the inputs I*a*5 and I*c*5 is only V, is nevertheless small compared with the sustaining voltage so that the alarm lamp AL becomes de-energized when the nominal voltage applied across the inputs I*a*5 and I*c*5 is reduced to 0. By employing an alternating-current frequency that is high compared with 20 c.p.s., especially one that has a period that is short compared with the de-ignition time of the alarm lamp, the alarm lamp AL appears to be steadily energized whenever it is thus ignited.

With the arrangements of FIGS. 5*a* and 5*b*, the alarm light AL of the implication circuit K is "on" if Equations 4 and 5 are not satisfied. In other words, the alarm light of the implication circuits is "on" if the facts employed in setting the two switches in the signal sources S*a*5 and Sc5 at the input of implication circuit are inconsistent with the implication relationship of $$a \supset c$$

In any event, however, the output of the OR gate OG5 appearing at the main output Oc is equal to the logical sum of the propositions governing the truth-value signals applied to the input. The output of the implication circuit is equal to the truth value of the antecedent or left member of the Equation 3 in case there is an inconsistency between the antecedent and the consequent propositions. However, if the truth values of the signals applied to the input of the implication circuit are not consistent with Equations 4 and 5, the output of the implication circuit is the truth value of the consequent. In other words, for example, if the truth value of *c* is consistent with the truth value of *a*, then the output of the implication circuit K is C. Similarly, if the truth values C and A are inconsistent, the output of the implication circuit K is the truth value A. With this arrangement, the truth value appearing at the main output Oc thus represents the higher truth value of the information available with respect to the two propositions *a* and *c*. At the same time, however, any inconsistency that may exist in the data as represented by these truth values is indicated by ignition of the alarm lamp AL.

COMPOUND-PROPOSITION LOGIC CIRCUITS

To illustrate the wide variety of fields to which the invention is applicable, some simple circuits for producing manifestations of the truth values of a number of compound propositions by means of three-valued logic are illustrated in FIGS. 6, 7, 8 and 9, inclusive, and some circuits for solving more complex logic problems are illustrated in FIGS. 10, 11, 12, 13, 14 and 15. In some of these circuits, truth values of the information supplied are indicated merely by the positions of the switch arms of the sources. Truth-value indicators are employed in the outputs. But, in addition, in some circuits source-type truth-value indicators are also employed.

To simplify the description, except where otherwise noted, all of these circuits employ the source units, AND gates, OR gates, negators, implicators, and truth-value indicators of the types illustrated in FIGS. 1, 2, 3, 4*a* and 5*a*. With this arrangement, then, all of these units may be energized by a common regulated voltage supply VS, not shown, that supplies voltages +V, O, and −V to the various terminals as needed. In the case of the inverter of FIG. 4*a*, an auxiliary center-tapped power supply is employed that provides suitable voltages to the terminals B4*a*− and B4*a*+ that are of greater magnitude than V. The center tap of this power supply is connected to the center tap of the regulated voltage supply VS.

Each of the various compound-proposition logic circuits hereinafter described employs a plurality of inputs and one or more outputs. The logic circuits are so designed that the truth value of a compound proposition that is a known logical function of a plurality of component propositions is manifested at an output when manifestations of the truth values of the component propositions are applied to the inputs. Each set of truth-value signals applied to the inputs produces a corresponding unique truth-value signal at each output, though any particular truth-value signal appearing at an output can often be generated by different sets of truth-value signals applied to the inputs. In many cases, a truth-value signal that manifests falsity appears at an output even though a truth-value signal of unknown truth and unknown falsity may be applied to oen or more of the inputs of the logic circuit. Thus, with these arrangements, the truth or falsity of a compound proposition may be determined even though the truth and falsity of only some of the component propositions are known.

SOME SIMPLE COMPOUND-PROPOSITION LOGIC

In the relatively simple compound proposition logic circuits illustrated in FIGS. 6–9, inclusive, the truth value of a true proposition *p* is ascertained automatically from the truth values of the component propositions *a*, *b*, *c*, *d*, etc., in terms of which the compound proposition *p* is expressed. In these cases, a logical combining circuit is provided that has a plurality of inputs and a single output. Output means are employed which are jointly responsive to a set of truth value manifestations applied by control means to the inputs for producing at said output means a truth value manifestation which is a predetermined logical combination of the truth value manifestations applied to said inputs. In these circuits, the truth value corresponding to each component proposition is applied to a corresponding input from a three-level signal source, and the corresponding truth value of the compound proposition appearing at the output of the logical circuit is indicated visually by means of one of the three-level truth-value indicators previously described.

FIG. 6 is a circuit for determining the truth value of the logical sum of two logical products. In this specific example, the compound proposition *p* is related to the component propositions *a*, *b*, *c*, *d* and *e* by the equation $$ab+cde=p \qquad (6)$$

The circuit for solving this equation includes an output gate in the form of an OR gate OG6 having an output terminal and two input terminals. This circuit also includes two AND gates AG61 and AG62 having two and three input terminals respectively. One of the input terminals of the output gate OG6 is connected to the output terminal of the AND gate AG61. The other input terminal of the output gate OG6 is connected to the output terminal of the other AND gate AG62. The AND gates AG61 and AG62 are said to be of the first order and the OR gate OG6 of the second order.

The circuit also includes five three-level sources S*a*, S*b*, S*c*, S*d* and S*e* corresponding to the propositions *a*, *b*, *c*, *d* and *e* respectively. The two input terminals of the AND gate AG61 are connected to the sources S*a* and S*b* respectively. The three input terminals of the AND gate AG62 are connected to the sources S*c*, S*d* and S*e* respectively. An OR-type truth-value indicator TV*i*6 is connected to the output of the OR gate OG6.

Figure 7:
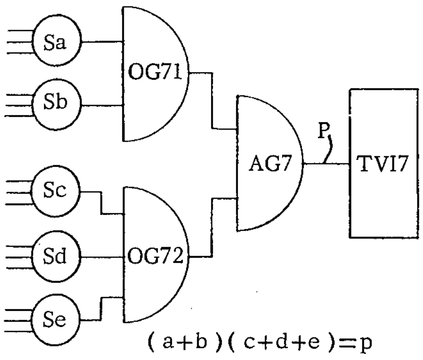

FIG. 7 is a circuit for determining the truth value of the logical sum of two logical products. In this specific example, the compound proposition *p* is related to the propositions *a*, *b*, *c*, *d* and *e* by the equation $$(a+b)(c+d+e)=p \qquad (7)$$

The circuit for solving this equation includes an output gate in the form of an AND gate AG7 having an output terminal and two input terminals. This circuit also includes two OR gates OG71 and OG72 having two and three input terminals respectively. One of the input terminals of the output gate AG7 is connected to the output terminals of the OR gate OG71. The other input terminal of the output gate AG7 is connected to the output terminals of the other OR gate OG72. This circuit also includes five three-level sources. Two sources S*a* and S*b* are connected respectively to two inputs of the OR gate OG71, and three sources S*c*, S*d* and S*e* are connected respectively to three inputs of the OR gate OG72. An AND-type truth-value indicator TVI7 is connected to the output of the AND gate AG7. The OR gates OG71 and OG72 are of the first order, while the AND gate AG7 is of the second order.

Figure 8:
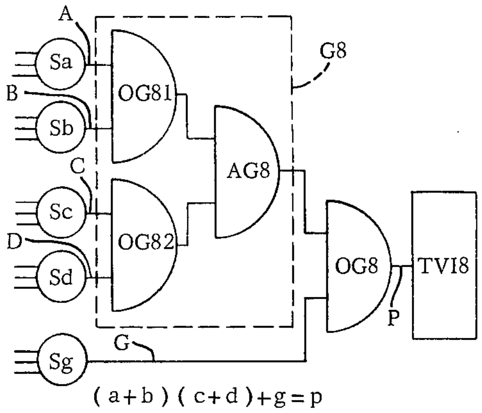

In FIG. 8 there is illustrated a circuit for determining the truth value of the compound logical proposition $$(a+b)(c+d)+g=p \qquad (8)$$

It will be noted that Equation 8 is very similar to Equation 7, except that the proposition *e* is omitted and the proposition *g* is added to the terms on the left-hand side of Equation 7. To solve Equation 8, a logical circuit G8 is used which includes gates OG81, OG82 and AG8 connected like the gates OG71, OG72 and AG7, as illustrated in FIG. 7, except that the input corresponding to proposition *e* is omitted. In addition, an output gate in the form of an OR gate OG8 is employed. One input terminal of this gate OG8 is connected to the output of the logical unit G8, while the other input terminal is connected to a three-level signal source S*g*. The other signal sources S*a*, S*b*, S*c* and S*d* corresponding to the propositions *a*, *b*, *c* and *d* are connected to the inputs of the gates OG81 and OG82 as in FIG. 7. In this case, however, the remaining terminal of the OR gate OG82 is omitted or is simply left floating since the truth value of the proposition *e* does not affect the solution of Equation 8. An OR-type truth-value indicator TVI8 is connected to the output terminal of the output gate OG8. The OR gate OG8 is of the third order.

Figure 9:
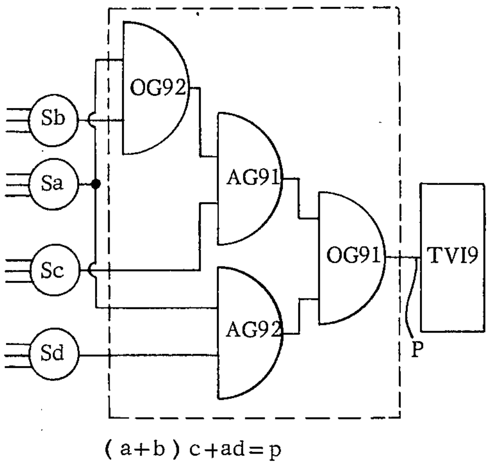

In FIG. 9 there is illustrated a circuit for solving the propositional equation $$(a+b)c+ad=p \qquad (9)$$

This circuit employs an output OR gate OG91 and three additional gates OG92, AG91, and AG92, together with an OR-type truth-value indicator TVI9 and four three-level sources S*a*, S*b*, S*c* and S*d*. These circuits are interconnected in accordance with the principles illustrated above. The output terminals of AND gates AG91 and AG92 are connected to the input terminals of OR gate OG91 and the output terminal of OR gate OG92 is connected to an input terminal of AND gate AG91. The three-level sources S*b*, S*c* and S*d* are connected to corresponding input terminals of the gates OG92, AG91 and AG92. In this case, however, it is to be noted that the same source S*a* is connected to the inputs of two gates OG92 and AG92 to take into account that the proposition *a* occurs in two terms of Equation 9. The OR gate OG92 is of the first order, the AND gates AG91 and AG92 are of the second order and the OR gate OG91 is of the third order.

In the construction of the various logic circuits illustrated herein, such as those illustrated in FIGS. 6, 7, 8 and 9, precautions are taken to prevent undesirable interactions between the various gate units which would so alter the magnitude of the output signals that the truth-value indicators connected at the outputs that erroneous indications of truth value would be produced. More particularly, the values of the resistances employed in the various circuits are so chosen that the voltage representing a truth-value manifestation at the output of any gate unit departs from the nominal truth value voltage +V, 0, or −V by such a small amount that proper ignition and de-ignition conditions occur at the output of the logical circuit representing the compound proposition involved. More particularly, satisfactory results can be obtained by employing a ballast resistor in each gate unit which is large compared with the ballast resistor of any gate unit of lower order to which it is connected. Also, whenever truth-value indicators are connected at an input of a gate unit, the values of the ballast resistors of the indicator are so chosen that the voltage at the input or the output does not depart greatly from its nominal value when a truth-value lamp in the truth-value indicator ignites.

By way of illustration, a circuit of the type illustrated in FIG. 6 and having circuit elements of specific values that have been found to be satisfactory is shown in FIG. 6′. In this circuit, a source-type truth-value indicator TVI*a*, TVI*b*, TVI*c*, TVI*d*, TVI*e* is connected at the output of each source unit S*a*, S*b*, S*c*, S*d*, S*e*, respectively; and AND-type truth-value indicator TVI61 and TVI62 is connected at the output of each AND gate AG61 and AG62 respectively; and the truth-value indicator TVI6 that is connected to the output of the OR gate OG6 is of the OR type. Each of the truth-value indicators had a true lamp TL in its upper section and a false lamp FL in its lower section. In this specific case, the truth-value lamps of all the truth-value indicators were those that are manufactured by the General Electric Company and designated by the type number NE51, and the diodes were either of the type 1N51A or 1N451 manufactured by Sylvania Electric Products, Inc. In the source-type truth-value indicators, balance resistors having resistances of 51K were employed. In the AND gates, ballast resistors having resistances of 11K were employed. In the OR gate, a ballast resistor of 100K was employed. In the output truth-value indicator TVI6, the upper ballast resistor TR had a resistance of 100K and no lower ballast resistor was employed, the resistance in the lower part of the circuit being supplied by the false lamp FL itself. With this arrangement, satisfactory operation was achieved with a regulated voltage supply that provided voltages of about +47 v., 0 and −47 v. In this application kilohms are represented by the symbol K.

While the truth-value lamps of the various truth-value indicators of the circuit of FIG. 6′ do not glow with the same intensity when excited, they do glow with satisfactory intensity. Thus, while the values of the various resistances in the truth-value indicators have not been selected to produce lamp-glowing intensities that are uniform, they have been selected to prevent interactions between the various circuits which otherwise could produce erroneous indications. It will be understood that the requirement for accuracy and reliability takes precedance over the requirement for uniform intensities, though with care, all such requirements can often be met in the same system.

*An insurance company problem*

In FIG. 10, there is illustrated a circuit for determining the truth values of the following propositional equations:

$$d+d'a[bc'e+(bc'e)'f]=p_1 \qquad (10)$$

$$d+e=p_2 \qquad (11)$$

and for determining whether they are consistent. These equations are the same as the two equations which were treated by Edmund C. Berkeley in "Boolean Algebra and Applications to Insurance," published in the Record of the American Institute of Actuaries, Vol XXVI, part II, No. 54, October 1937, pp. 373–414. Except for a slight change in notation, these equations are identical with those appearing at page 378 of Berkeley's article.

While Berkeley solved the problem involving the foregoing equations by means of the class calculus, the same equations apply where the propositional calculus is used and where the propositions in Equations 10 and 11 have the following meanings.

*a*=Some premiums under existing mode of premium payments fall due on policy anniversaries.
*b*=The insured requests paying annual premiums on each policy anniversary.
*c*=The existing paid-to date is a policy anniversary.
*d*=The date of the request is within two months of the issue date of the policy.
*e*=The date of the request is within two months following my policy anniversary.
*f*=The date of the request is within the grace period of the last premium paid under the old mode of premium payments.
*p*=Full credit is to be allowed for the premium or premiums previously paid and a regular or an irregular premium whichever may be required, is to be charged from the due date of the first of such premiums so credited to the next desired due date under the new mode of premium payments.
$p_1$ and $p_2$ represent the conclusions drawn respectively by application of Equations 10 and 11.

In deriving the two Equations 10 and 11 in question, Berkeley employed two-valued logic, that is, Boolean algebra. For the purposes of the present discussion, it is not necessary to question the validity of the derivations of the two equations when account is taken of a third truth value. However, by means of Boolean algebra, Berkeley derived a formula for the classes of situations in which the two equations are inconsistent. The circuit of FIG. 10 can be used to identify those inconsistencies. But, in addition, this same circuit can be used to identify further inconsistencies which exist when account is taken of the fact that it may not be known whether certain of the propositions of Equations 10 and 11 are true or whether they are false.

In the circuit of FIG. 10, there are two logic circuits R101 and R102 which represent Equations 10 and 11, respectively. A plurality of three-level source units S*a*, S*b*, S*c'*, S*d*, S*d'*, S*e* and S*f* of the type described above, are connected to the inputs of the circuits R101 and R102 while two truth-value indicators TVI101 and TVI102 are connected to the outputs thereof. The two sources S*d* and S*d'* are ganged as in FIG. 1, so that their output signals are always of equal magnitude but of opposite sign to each other. The truth values of the two logic circuits R101 and R102 are indicated by the truth-value indicators TVI101 and TVI102 connected to their respective outputs. In addition, a consistency, or comparison, circuit Y10 is connected to the outputs of the two logic circuits R101 and R102 for indicating whether or not the truth values of the compound propositions $p_1$ and $p_2$ are the same. In this connection, it will be understood that the truth values are consistent if they are equal, but are inconsistent if they are different. The consistency circuit Y10 is in the form of a consistency lamp CL connected in series wiht a resistor R105 between the outputs of the two logic circuits R101 and R102.

To achieve the desired results, the lamp CL is one that is ignited when the voltage across it is V or 2V. For this reason, the consistency lamp CL may be an incandescent lamp or else a gaseous discharge lamp that has a lower ignition voltage than that of the truth-value lamps of the truth-value indicators TVI101 and TVI102. Alternatively, the consistency lamp CL can be energized by a relay R106 having its winding W10 in series with the resistor R105*a* as shown in FIG. 10*a*. In this case, the consistency lamp is connected in a circuit that includes a pair of normally open contacts K10 and a ballast resistor R105 between terminals of a power supply.

In this circuit, the consistency lamp CL of the consistency circuit Y10 is "on" when the truth values of the two propositions $p_1$ and $p_2$ are inconsistent, but is "off" when they are consistent. The circuit representing the proposition $p_1$ includes two first-order AND gates AG101 and AG102 at its input, a fourth-order OR gate OG101 at its output, and two third-order AND gates AG103 and AG104, and a second-order inverter I interconnecting the input gates AG101 and AG102 with the output gate OG101. The signal sources S*d'* and S*a* are connected to the two inputs of the AND gate AG101, so that the truth value T(*d'a*) of the compound proposition *d'a* appears at the output of the gate AG101. The three sources S*a*, S*c'* and S*e* are connected to the three inputs of the AND gate AG102. The truth value T(*bc'e*) of the compound proposition *bc'e* appears in the output of this gate.

The outputs of the two AND gates AG101 and AG102 are supplied to the input of another AND gate AG103, thereby producing the truth value T(*d'abc'e*) of the proposition *abc'd'e* at its output. The output of the gate AG101 is applied to one of the inputs of the AND gate AG104, while the output of the AND gate AG102 is applied to an input of the AND gate AG104 after being transmitted through the inverter I. A signal representing the truth value T((*bc'e*)') of the proposition (*bc'e*)' appears at the output of the inverter I and is applied to the corresponding input of the AND gate AG104. A truth-value signal from the source S*f* is also applied to an input of the AND gate AG104. In addition, a truth-value signal from the multi-level source S*d* is applied to an input of the gate OG101. Due to the combined action of the circuits connected to the input of the AND gate AG104, a truth-value signal T(*d'a*(*bc'e*)'*f*) of the proposition *d'a*(*bc'e*)'*f* appears at the output of the gate AG104. The outputs of the two intermediate AND gates AG103 and AG104 and a truth-value signal from the source S*d* are applied to corresponding inputs of the output OR gate OG101. The combined action of all of the circuits connected between the signal sources and the output of the output gate OG101 is to produce a truth-value signal at the output of the gate OG101, which represents the truth value $P_1$ of the proposition $p_1$ of Equation 10.

The logic circuit R102 is simply an OR gate OG103 having two inputs that are connected respectively to the two sources S*d* and S*e*. With this circuit, the truth value of the proposition $p_2$ represented in Equation 11 appears at the output of the circuit R102.

It is interesting to consider what values of the outputs of the two logic circuits R101 and R102 appear for some of the possible sets of truth values of the component propositions *a*, *b*, *c*, *d*, *e* and *f*.

Suppose, for example, that proposition *d* is known to be true. Then, irrespective of the truth values of any of the other propositions, both the propositions $p_1$ and $p_2$ are true. Corresponding signals of +1 appear in the outputs of both of the circuits R101 and R102 causing the true lights TL of both of the truth-value-indicating circuits TVI101 and TVI102 to be energized. Under these circumstances, the consistency lamp CL is not energized. Both true lights TL are "on" forming one indication of consistency, and the consistency light CL remains "off" providing another indication of consistency.

Now, suppose that propositions *a* and *f* are known to be true, and propositions *d* and *e* are known to be false, while it is not known whether either of the propositions *b* and *c* is true or whether either is false. In this case, the truth values of the two compound propositions $p_1$ and $p_2$ are $P_1=0$ and $P_2=-1$, respectively. In other words, the results are inconsistent. This result is indicated correctly in each of two ways. First of all, the consistency lamp CL is energized. Secondly, neither the true lamp nor the false lamp of the indicator TVI101 is energized, but the false lamp of indicator TVI102 is energized.

Suppose, however, that proposition *d* is false and that proposition *e* is true, but that it is not known whether proposition *a* is true or false. In this case, the truth value of the proposition $p_1$ is unknown though the truth value of the proposition $p_2$ is known. In this case, the output of the circuit R1 is 0 and the output of circuit R2 is +1. These output signals are also inconsistent.

Suppose, however, that the following set of truth values exists:

$$A=0, B=1, C=-1, D=1, E=1, F=1$$

In this case, the truth values $P1=0$ and $P2=+1$ are correctly indicated in the outputs of the two circuits. This set of truth values also, therefore, yields truth values of the propositions $p_1$ and $p_2$ that are inconsistent.

Another inconsistency is found when the truth values are $$A=1, B=1, C=0, D=-1, E=1, F=1$$

None of the foregoing examples of inconsistencies are recognized in Berkeley's paper. It thus appears from a consideration of the circuit of FIG. 10 that three-valued logic is actually a powerful tool that can be employed to solve problems which are not solvable, at least not very readily, by Boolean algebra, and it furthermore appears that the circuits of this invention make it possible to solve problems in three-valued logic readily.

In an alternative type of inconsistency indicator represented in FIG. 10*a*, a resistor R105*a* and a relay winding W10 are connected in series in a circuit which is connected across the outputs of the two logic circuits R101 and R102 of FIG. 10. In this case, the alarm lamp CL is connected in series with the ballast resistor R105*a* in a circuit that includes a pair of normally open contacts K10. This circuit is connected to a suitable power supply. With this arrangement, whenever the output signal of the logic circuits R101 and R102 are inconsistent, current flows through the relay winding W10, thus closing the contacts K10 and energizing the alarm lamp CL. It is to be noted that the inconsistency circuits illustrated in FIGS. 10 and 10*a* act bilaterally in that they respond in the same manner irrespective of the polarity of the voltage applied across them. In this respect, they differ from the unilaterally-operated consistency circuits employed in the implication circuits of FIGS. 5*a* and 5*b*.

The problem represented by the inconsistencies which appear from the application of Equations 10 and 11 is the type of problem which is likely to occur in practice, not only in applying the rules of an insurance company, but also in applying rules applicable to other fields. Since such inconsistencies in the rules are objectionable, it is desirable, at least in some cases, to provide a simple way of removing such inconsistencies without complete revision of the wording of the rules themselves. In FIGS. 11*a* and 11*b*, two reconciliators, or reconciliation circuits, are provided for eliminating such inconsistencies in ways which meet many practical conditions.

In the system illustrated in FIG. 11*a*, a reconciliator RC11*a* is provided which produces a unique output $p$, which is favorable to the insured party if the truth value of either proposition $p_1$ or proposition $p_2$ is $+1$ and is unfavorable to the insured party only if the truth value of both propositions $p_1$ and $p_2$ are $-1$. In the arrangement of FIG. 11*a*, the outputs of the two logic circuits R101 and R102 of FIG. 10 are connected both to two inputs of an OR gate OG11*a* and to two inputs of an AND gate AG11*a* in the reconciliation circuit. The output of the OR gate OG11*a* is connected through a true lamp TL11*a* through an upper ballast resistor TR11*a* to the negative terminal $-V$ of the voltage supply. The output of the AND gate AG11*a* is connected through a false lamp FL11*a* through a lower ballast resistor FR11*a* to the positive terminal $+V$ of the voltage supply. It is to be noted that with this circuit, if either proposition $p_1$ or $p_2$ is not known to be true or false, then neither of the truth-value lamps TL11*a* and FL11*a* is ignited unless one of the propositions $p_1$ or $p_2$ is known to be true. Under these circumstances, therefore, uncertainties in the truth values are resolved in favor of the insured.

The system of FIG. 11*b* is similar to that illustrated in FIG. 11*a*. In this case, however, the AND gate and the OR gate are interchanged. The output of the AND gate is connected through the true lamp TL11*b* and the upper ballast resistor TR11*b* to the negative terminal $-V$, and the output of the OR gate OG11*b* is connected through the false lamp FL11*b* and the lower ballast resistor FR11*b* to the positive terminal $+V$.

With this arrangement, doubts are resolved against the insured and in favor of the company. More particularly, in this case, the true lamp TL11*b* is ignited only if both proposition $p_1$ and proposition $p_2$ are known to be true, and the false lamp FL11*b* is ignited if either proposition $p_1$ or $p_2$ is known to be false.

*Some patent infringement problems*

This invention is also applicable to the solution of many legal problems. Applications of the invention to legal problems are here illustrated with reference to some highly simplified problems respecting patent infringement. A circuit of the type that may be used for the solution of such a problem is illustrated in FIG. 12 and another in FIG. 13. The circuit of FIG. 12 is designed particularly to determine whether there is infringement of a patent which includes five apparatus claims that can be represented by the following equations:

$$c_1 = dsp \quad (12)$$

$$c_2 = gsp \quad (13)$$

$$c_3 = gs \quad (14)$$

$$c_4 = sp \quad (15)$$

$$c_5 = gsl \quad (16)$$

where $s$=the device includes a shaft
$d$=the device includes a pulley
$g$=the device includes a gear
$p$=the device includes a support member
$l$=the device includes a support plate No claim would contain only the mechanical elements specified above. Patent claims for a mechanical device would also specify properties of the elements, or relations between the elements, or even the relations between properties and the properties of relations. These features have been omitted here for the purpose of illustration. Though over-simplified, the example of FIG. 12 illustrates how the principles employed in applying this invention to a patent infringement problem.

A patent claim of the apparatus-type with reference to which this example is illustrated represents a class of devices. However, the class can be described in terms of propositions as has been done above. Thus, for example, Claim 2, if such a claim were proper, could be written in the form:

2. A device comprising a gear, a shaft, and a support member.

If this is a claim, then the claim would be literally infringed if each of the propositions $g$, $s$ and $p$ is true, but would not be literally infringed if one or more of these propositions $g$, $s$, or $p$ are false with reference to the particular device undergoing investigation.

Each of the formulas for the claims $c_1 \ldots c_5$ represents the logical product of statements that must be true for the corresponding claim to be infringed. However, for the patent to be infringed, it is only necessary that the logical sum of the formulas representing the claims be true. For this reason, infringement of the patent with these five claims would exist if and only if the following proposition is true:

$$c_1 + c_2 + c_3 + c_4 + c_5 = n \quad (17)$$

Since a support plate is a support member, the following additional equation applies:

$$l \supset p \quad (18)$$

This equation means that if $l$ is true, than $p$ is true. Equation 18 also says that if it is not known whether $l$ is true or false, then $p$ cannot be false, and furthermore that if $p$ is false, $l$ must also be false.

The circuit of FIG. 12 takes into account all of the logical relations involved in Equations 12 to 18 and makes it possible to determine whether it can be ascertained from the truth values of the propositions $g$, $d$, $l$, $p$ and $s$, whether the device described by those truth values does or does not infringe the patent in question and whether the information supplied is sufficient to determine the question.

In FIG. 12, the output logic circuit is a three-level OR gate OG120. This gate represents the logical disjunction expressed by Equation 17. A three-level truth-value indicator TVI120 of the OR-type is connected to the output of the logic circuit in order to indicate whether there is infringement or non-infringement, or whether the information supplied is sufficient to determine the question. The output gate OG12 has five input terminals that are connected through the normally closed validity switches S1, S2, S3, S4 and S5 to the outputs of the five AND gates designated by the symbols AG121, AG122, AG123, AG124, and AG125. The five AND gates correspond to the five claims $c_1$, $c_2$, $c_3$, $c_4$ and $c_5$ respectively. In addition, the circuit employs five three-level signal sources S*g*, S*d*, S*l*, S*p* and S*s*. Truth-value indicators TVI*g*, TVI$d$, TVI$l$, TVI$p$, and TVI$s$ are connected to the outputs of the respective signal sources S$g$, S$d$, S$l$, S$p$, and S$s$. The logic circuit of FIG. 12 also includes an implication circuit K of the type previously described, in order to take into account the relations represented by Equation 18. Truth-value indicators TVI121, TVI122, TVI123, TVI124 and TVI125 of the AND-type connected to the outputs of the AND gates AG121, AG122, AG123, AG124, and AG125 respectively are employed to indicate whether individual claims are infringed. In addition, the truth-value indicators TVI$g$, TVI$d$, TVI$l$, TVI$p$, and TVI$s$, are connected at the output of the signal sources S$g$, S$d$, S$l$, S$p$ and S$s$ respectively.

In the logic circuit of FIG. 12, the inputs of the AND gates are connected to signal sources S$g$, S$d$, S$l$, S$p$ and S$s$ in accordance with the Equations $c_1$, $c_2$, $c_3$, $c_4$ and $c_5$, for the claims. More particularly, the three inputs of the AND gate AG121 are connected respectively to the main output of the implication circuit K, the output of the signal source S$s$, and the output of the source S$d$; the three input terminalts of the AND gate AG122 are connected respectively to the output of the source S$g$, the main output of the implication circuit K, and the signal source S$s$. The two input terminals of the AND gate AG123 are connected respectively to the outputs of the signal source S$g$ and the signal source S$s$. The input terminals of the AND gate AG124 are connected respectively to the main output of the implication circuit K, and the signal source S$s$. And the input terminals of the AND gate AG125 are connected respectively to the signal source S$g$, the signal source S$s$, and the signal source S$l$.

In using the circuit of FIG. 12, all the validity switches $S_1$, $S_2$, $S_3$, $S_4$ and $S_5$ corresponding to the claims which are not known to be invalid are closed. This operation expresses the principle of law that a claim is presumed to be valid unless proved to be invalid. Otherwise, the switches corresponding to any claim which is known to be invalid are opened. Let us consider what occurs when it is assumed that all of the claims are valid.

Initially, all of the sources are set in their neutral or "don't know" position in which 0 signals appear in their respective outputs. In this condition, all the truth-value indicators TVI120, TVI121, TVI122, TVI123, TVI124 and TVI125 at the outputs of the infringement gates give a neutral or "don't know" indication and the implication alarm lamp AL11 of the implication circuit K is "off." This condition is indicated in row 1 of Table F12.

Consider first a device that includes both a gear and a shaft. In this case, $G=1$ and $S=1$. The user, knowing that both the statements $g$ and $s$ are true, moves the switches of the two source units S$g$ and S$s$ to the right. This produces +1 or "true" signals at the outputs of the signal sources S$g$ and S$s$. When this is done, the truth-value indicating circuits TVI120 and TVI123 turn on, indicating that the patent is infringed, and more particularly, that Claim 3 is infringed. The remaining truth-value indicators TVI111, TVI112, TVI114 and TVI115 continue to provide "don't know" indications. The foregoing relationships are set forth in the second row of Table F12.

Suppose now that it is determined in addition that a plate is not present, that is, that proposition $l$ is false, that is that $L=-1$. In this case, the switch of source S$l$ is turned to the left, producing a −1 or "false" signal at its output. This change in the signal supplied by the source S$l$ produces no change in the main output O$c$ of the implication circuit K. However, it causes a −1 signal to appear in the output of the gate AG125 energizing the false lamp of the truth-value indicator TVI125, thus showing that Claim 5 is not infringed. However, the truth-value indicator TVI112 remains energized since Claim 3 is infringed. This condition is indicated in row 3 of Table F12.

Suppose now that it is determined in addition that the device in question includes a support member that is not a plate. Taking this additional fact into account, the operator turns the switch of the source S$p$ to the right, producing a +1 signal at its output, thereby applying a +1 signal to the corresponding inputs of the AND circuits AG121, AG122, and AG123. With the sources in this condition, a +1 signal appears in the output of the AND gates AG122 and AG124, causing the true lamps of the truth-value indicators TVI122 and TVI124 to be energized, indicating that Claims 2 and 4 are infringed. This condition is indicated in row 4 of Table F12.

Thereafter, assume that it is determined that Claim 4 is invalid. This is taken into account by opening the switch $S_4$. In this case, any signal indicated by the truth-value indicator TVI124 is to be ignored as indicated by the letter I in row 5 of Table F12. Since, upon opening the switch $S_4$, the true lamp TL of the output truth-value indicator TVI11 still remains ignited, this shows that even though Claim 4 is invalid, the device with respect to which $g$, $p$ and $s$ are true and $l$ is false, infringes the patent, and more particularly, Claims 2 and 3 are infringed, but that Claim 5 is not infringed. This conclusion is correct even though it is not known whether $d$ is true, that is, whether a pulley is present. This condition is expressed by row 5 of Table F12.

Let it be assumed that a person recognizes that $G=+1$, $S=+1$, and $L=+1$ with respect to some device, but that he does not know whether $d$ or $p$ is true or false. In this case (assuming all claims are valid), Claims 2, 3, 4 and 5 are infringed and it is not known whether or not Claim 1 is infringed, all as indicated by the data in row 6 of Table F12. But in addition, the alarm light of the implication circuit K is energized showing that the assumed data regarding $p$ is inconsistent with what is known regarding $l$. By manipulating the switch of the source S$p$, it is found that the alarm light turns off only when $P=+1$. This reveals that a support member is present, even though it was not recognized as such. When the value of $p$ has been corrected, the condition of the circuit is that indicated by row 7. If it is determined subsequently that $d$ is false, Claim 1 is not infringed and the state of the circuit is as indicated in row 8.

The logic circuit of FIG. 13 is an example of a circuit for determining questions involving patent infringement where account is taken of the relations between mechanical parts. This figure represents a logical circuit for de-

*Table F12*

| Row | G | D | L | P | S | AL | TVI120 | TVI121 | TVI122 | TVI123 | TVI124 | TVI125 |
|---|---|---|---|---|---|---|---|---|---|---|---|---|
| 1 | 0 | 0 | 0 | 0 | 0 | OFF | N | N | N | N | N | N |
| 2 | +1 | 0 | 0 | 0 | +1 | OFF | T | N | N | T | N | N |
| 3 | +1 | 0 | −1 | 0 | +1 | OFF | T | N | N | T | N | F |
| 4 | +1 | 0 | −1 | +1 | +1 | OFF | T | N | T | T | T | F |
| 5 | +1 | 0 | −1 | +1 | +1 | OFF | T | N | N | T | I | F |
| 6 | +1 | 0 | +1 | 0 | +1 | ON | T | N | N | T | N | T |
| 7 | +1 | 0 | +1 | +1 | +1 | OFF | T | N | T | T | T | T |
| 8 | +1 | −1 | +1 | +1 | +1 | OFF | T | F | T | T | T | T |

termining whether infringement exists of a patent that includes the claims:

$$c_6=N(d,s)J(s,l) \quad (19)$$
$$c_7=N(d,s)J(s,p) \quad (20)$$
$$c_8=S(g,s)N(s,p) \quad (21)$$
$$c_9=K(g,s)J(s,l) \quad (22)$$
$$c_{10}=K(g,s)N(s,p) \quad (23)$$

where $s$, $d$, $g$, $p$ and $l$ have the meanings:

$s$=a shaft is present (24)
$d$=a pulley is present (25)
$g$=a gear is present (26)
$p$=a support member is present (27)
$l$=a support plate is present (28)

and where $N(m_1, m_2)$=the member $m_1$ mentioned in the proposition is on the member $m_2$ mentioned in the proposition; (29)
$S(m_3, m_4)$=the member $m_3$ mentioned in the proposition is secured to the member $m_4$ mentioned in the proposition; (30)
$K(m_5, m_6)$=the member $m_5$ mentioned in the proposition is keyed to the member $m_6$ mentioned in the proposition; (31)
$J(m_7, m_8)$=the member $m_7$ mentioned in the proposition is journalled to the member $m_8$ mentioned in the proposition. (32)

Here, it will be noted that the claims are described in terms of binary, or dyadic, relations $N(m_1, m_2)$, $S(m_3, m_4)$, $K(m_5, m_6)$, and $J(m_7, m_8)$. In the Equations 19, 20, 21, 22 and 23, representing claims $c_6$ to $c_{10}$, it is assumed that wherever the same term is set forth as a member of two relations, it is the same member.

These claims might be read, for example:

$c_6$=a pulley, a shaft, a support plate, said pulley being on said shaft, said shaft being journalled to said plate. (19')
$c_7$=a pulley, a shaft, a support member, said pulley being on said shaft, said shaft being journalled to said support member. (20')
$c_8$=a gear, a shaft, a support member, said gear being secured to said shaft, said shaft being on said support member. (21')
$c_9$=a gear, a shaft, and a plate, said gear being keyed to said shaft, and said shaft being journalled to said plate. (22')
$c_{10}$=a gear, a shaft, a support plate, said gear being keyed to said shaft, said shaft being on said support member. (23')

Without changing the meaning significantly, the claims could be written in other ways. For example, Claim 9 could be read:

$c_9$=a support plate, a shaft journaled to the plate, and a gear keyed to the shaft. (22'')

or even $c_9$=a gear keyed to a shaft journaled to a support plate. (22''')

The claims could all be written in a corresponding declaratory or statement form (if permitted by the Rules of the Patent Office), based on the formulas set forth above.

Thus, for example, Claim 9 could be written:

$c_9$=a gear is keyed to a shaft and the shaft is journalled to a plate. (22'v)

The question whether there is infringement of a claim depends on the truth value of the claim in statement form. Thus, for example, the infringement of Claim 9 depends on the truth values of the statements $K(g,s)$ and $J(s,l)$. Similar remarks apply to the other claims. Thus, the patent including the claims $c_6 \ldots c_{10}$ would be infringed if and only if the proposition $$c_6+c_7+c_8+c_9+c_{10}=n \quad (33)$$

is true.

The following relations are implied by the nature of the elements and relations specified in the claims:

$$1 \supset p \quad (34)$$
$$J(x,y) \supset N(x,y) \quad (35)$$
$$K(x,y) \supset N(x,y) \quad (36)$$
$$S(x,y) \supset N(x,y) \quad (37)$$
$$K(x,y) \supset S(x,y) \quad (38)$$

In view of the foregoing implication relationships and the nature of the relations 29, 30, 31, and 32, the following specific implication relationships exist:

$$J(s,l) \supset J(s,p) \quad (39)$$
$$J(s,l) \supset N(s,p) \quad (40)$$
$$J(s,p) \supset N(s,p) \quad (41)$$
$$K(g,s) \supset S(g,s) \quad (42)$$

Whether or not a particular implication relationship exists depends, of course, on the interpretation given the terms. While there might be some semantic disagreement as to whether $$J(m_i, m_j) \supset N(m_i, m_j)$$

this implication is assumed in 40 and 41. While the laws for stating such implication relationships as 39, 40, 41 and 42 have not been published, there can be little doubt that such implication relationships can be expressed by a system of logical laws.

It is to be noted that Equations 39, 40 and 41 can be written $$J(s,l) \supset J(s,p) \supset N(s,p) \quad (43)$$

Or, if desired, Equation 40 may be omitted from the set of Equations 39, 40, 41 and 42 without loss of generality.

This circuit of FIG. 13 makes use of six three-level sources, $S[K(g,s)]$, $S[(g,s)]$, $S[N(d,s)]$, $S[J(s,l)]$, $S[J(s,p)]$, $S[N(s,p)]$, and three implication circuits, K131, K132, and K133. This circuit also employs five AND gates AG136, AG137, AG138, AG139, and AG1310, that correspond to the five claims $c_6$, $c_7$, $c_8$, $c_9$, and $c_{10}$.

Truth-value indicators TVI136, TVI137, TVI138, TVI139, and TVI1310 of the AND-type are connected to the outputs of the respective AND gates AG136, AG137, AG138, AG139 and AG1310. All of the AND gates, as in the earlier example, are connected through corresponding validity switches $s_6$, $s_7$, $s_8$, $s_9$, and $s_{10}$ to corresponding inputs of an OR gate OG130 that is in the output and which is connected to the infringement indicator in the form of a truth-value indicator TVI130 of the OR-type.

The three implication circuits K131, K132 and K133 are of the same type as that illustrated in FIG. 5. Each has two inputs circuits I*a* and I*c* and two output circuits O*a* and O*c*. The various inputs and outputs of the respective implication circuits are separately indicated by the suffixes 131, 132 and 133 as the case may be.

A separate truth-value indicator TVI of the type illustrated in FIG. 1 is attached to the output of each of the six three-level signal sources. In this circuit, the signal source $S[K(g,s)]$ is connected to the antecedent input terminal I*a*131 of the implication circuit K131 and the output of the signal source $S[S(g,s)]$ is connected to the consequent input terminal I*c*131, thus taking into account the implication relationship of Equation 42. Likewise, the output of signal sources $S[J(s,l)]$ and $S[J(s,p)]$ are connected respectively to the antecedent input terminal I*a*132 and I*c*132 respectively of the implication circuit K132, thus taking into account the implication relationship of Equation 39. Furthermore, the main output terminal $Oa132$ of the implication circuit K132 and the output of the source S[N(*s,p*)] are connected to the antecedent input terminal $Ia133$ and the consequent input terminal $Ic133$ of the implication circuit K133, thus taking into account the implication relationship expressed by Equation 41. The connections between the sources S[J(*s,l*)], S[J(*s,p*)], S[N(*s,p*)], the implication circuit K132 and K133 take into account all the relations expressed by Equation 43.

To complete the connections to take into account the relationships involved in the claims as represented by Equations 19 to 23, the AND gates are connected to the various sources either directly or through the implication circuits.

One of the input circuits of the AND gate AG136 is connected directly to the output of the source S[N(*d,s*)] while the other input circuit of the AND gate AG136 is connected to the auxiliary output terminal $Oa132$, in this way taking into account the relations expressed by Equation 19. Similarly, one of the input circuits of the AND gate AG137 is connected directly to the output of the source S[N(*d,s*)] while the other input circuit of the AND gate AG137 is connected to the auxiliary output terminal $Oa133$, in this way taking into account the relations expressed by Equation 20. These connections also take into account the implication relationship represented by Equation 34. Similarly, one of the input circuits of the AND gate AG138 is connected to the output terminal $Oc131$ of the implication circuit K131, while the other input circuit of AND gate AG138 is connected to the main output terminal $Oc133$ of the implication circuit K133. These connections take into account both the relationships expressed by Equation 21 and the implication relationships expressed by Equation 42.

One of the input circuits of AND gate AG139 is connected to the auxiliary input terminal $Oa132$ of implication circuit K132, while the other input circuit of AND gate AG139 is connected to the auxiliary output terminal $Oa131$ of implication circuit K131. These connections take into account the relations expressed by Equation 22. One input terminal of AND gate AG1310 is connected to the main output terminal OC133 of the implication circuit K133, while the other input circuit is connected to the auxiliary input terminal $Oa131$ of implication circuit K131. These connections take into account the relations expressed by Equations 23 and 43.

It is to be noted that the circuit of FIG. 13 bears a close resemblance to the circuit of FIG. 12, except that a network of three implication circuits is employed and the manifestations produced by the sources represent the truth values of propositions that involve relations and not merely the truth values of propositions that involve the presence of mechanical elements. This circuit is employed like that of FIG. 12 to indicate whether or not infringement exists and whether sufficient information has been supplied to determine whether infringement exists, and also whether the assumed data are consistent.

In the operation of this circuit, the indication of the main truth-value indicator TVI130 indicates whether or not the patent is infringed or whether insufficient information has been supplied to determine the question. Likewise, the truth-value indicators TVI136, TVI137, TVI138, TVI139, and TVI1310 indicate whether the corresponding claims $c_6$, $c_7$, $c_8$, $c_9$, and $c_{10}$ are infringed, or whether insufficient information has been supplied to determine such a conclusion. Furthermore, the alarm lights AL131, AL132 and AL133 are energized when the information supplied to the inputs of the respective implication circuits K131, K132, K133 are inconsistent. In this case, the truth-value indicators connected to the outputs of the various sources indicate the manifestations of the truth values supplied by these sources.

*Some problems involving medical diagnosis*

In FIG. 14, there is illustrated a device for the diagnosis of symptoms in accordance with a particular set of medical laws. The medical laws involved here are those described in an article entitled "Reasoning Foundations of Medical Diagnosis," by Robert S. Ledley and Lee B. Lusted, appearing at pages 9 to 21 of Science, July 3, 1959, Volume 130, No. 3,366. These laws, which are based upon hypothetical "medical knowledge" described in that article, are as follows:

*Law 1.*—If a patient has a disease *d2*, he always has symptom *s1*.

*Law 2.*—If a patient has disease *d1* and not disease *d2*, then he always has symptom *s2*.

*Law 3.*—If a patient has disease *d2*, but not disease *d1*, then he never has symptom *s2*.

*Law 4.*—If a patient has either or both of the symptoms *s1* and *s2*, then he always has either one or both of the diseases *d1* and *d2*.

It will be recognized that these laws are four implications, namely:

$$d(2)\supset s(1) \quad \text{(Law 1)} \quad (44)$$

$$d(1)d'(2)\supset s(2) \quad \text{(Law 2)} \quad (45)$$

$$d(2)d'(1)\supset s'(2) \quad \text{(Law 3)} \quad (46)$$

$$s(1)+s(2)\supset d(1)+d(2) \quad \text{(Law 4)} \quad (47)$$

where $s(1)$ = the patient has symptom *s1*
$s(2)$ = the patient has symptom *s2*
$d(1)$ = the patient has disease *d1*
$d(2)$ = the patient has disease *d2*

If a doctor knows whether or not the patient has each of the symptoms, only four problems arise, namely, what would be the proper diagnosis under the following sets of conditions:

(A) If a patient has a symptom *s1* and symptom *s2*;

(B) If a patient has symptom *s1*, but not symptom *s2*;

(C) If a patient does not have symptom *s1*, but has symptom *s2*;

(D) If a patient does not have symptom *s1* and does not have symptom *s2*.

But a doctor does not always know whether or not a patient has every symptom that may lead to a diagnosis. This lack of knowledge may arise because a patient has not mentioned a symptom, or because the doctor has overlooked making an inquiry about it, or because the presence or absence of a symptom can only be determined by means of a test that has not yet been made. For this reason, five additional situations may arise which can be solved with the three-valued logic employed in this invention, namely:

(E) If a patient is known to have symptom *s1*, but it is not known whether he has symptom *s2*;

(F) If a patient is known not to have symptom *s1*, but it is not known whether he has smptom *s2*;

(G) If a patient is known to have symptom *s2*, but it is not known whether he has symptom *s1*;

(H) If a patient is known not to have symptom *s2*, but it is not known whether he has symptom *s1*;

(I) If it is not known whether the patient has either or both of the symptoms.

The solution to the problem represented by situation I is simple, but it is surprising to find that the solutions to problems representing other situations, such as situations E, are not easy.

By applying the principles of two-valued propositional calculus without taking into account three-valued logic, it can be shown that the diseases mentioned are related to the symptoms in accordance with the following equations:

$$s(2)\supset d(1) \quad (48)$$

$$s'(1)\supset d'(2) \quad (49)$$

$$s(1)s'(2) \supset d(2) \quad (50)$$

$$s'(1)s'(2) \supset d'(1) \quad (51)$$

For a complete diagnosis, these equations should be employed with Equation 47.

To facilitate the diagnosis by a doctor, the circuit of FIG. 14 may be employed to determine whether either or both of the diseases $d1$ and $d2$ are present. In this circuit, two source units S(1) and S'(1) that are ganged together like the sources of FIG. 1, are employed to produce manifestations of the truth values respecting the symptom $s1$. Likewise, two source units S(2) and S'(2) that are ganged together like the sources in FIG. 1, are employed to produce manifestations of the truth values respecting the symptom $s2$.

Two truth-value indicators are employed, TVI141 and TVI142 to indicate the manifestations of the truth values respecting the propositions $d(1)$ and $d(2)$. These truth-value indicators are somewhat different from those previously described. The reason for this is that both the conclusions $d(1)$, $d(2)$ and their negated $d'(1)$ and $d'(2)$ appear affirmatively in the consequent propositions of the set of Equations 39, 40, 41 and 42. The truth-value indicator TVI141 includes a true lamp TL141 and a false lamp FL141, each of which is connected to the negative terminal —V of the power supply. Likewise, the truth-value indicator TVI142 includes a true lamp TL142 and a false lamp FL142, each of which is connected at one end to the negative terminal —V of the power supply.

In this particular circuit, some of the connections between the source and the indicating lamps are direct. Others, however, are through AND gates AG141 and AG142. The lamps of the indicators are of the neon gaseous-discharge glow-lamp type and, as before, the voltages are so selected that a lamp is ignited only when the voltage across its terminals is 2V and is not ignited when the voltage across its terminal is V or less. One of the input circuits of the AND gate and AG141 is connected to the output terminal of the source S'(1) while the other input terminal of the AND gate AG141 is connected to the output terminal of the source S'(2). The output circuit of the AND gate AG141 is connected to the false lamp FL141, the other end being connected to the power supply terminal —V. The connections to false lamp FL141 thus takes into account the relationship expressed by Equation 51.

One of the input circuits of the AND gate AG142 is connected to the output terminal of the source S(1) while the other input terminal of the AND gate AG142 is connected to the output terminal of the source S(2). The output circuit of the AND gate AG142 is connected to the end of the true lamp TL142, the other end being connected to the power supply terminal —V. The connections to the true lamp TL142 thus take into account the relationship expressed by Equation 41.

A direct connection is made from the output of the source S(2) to the true lamp TL141, thus taking into account the relationship expressed by Equation 48. Similarly, a direct connection is made from the output of the terminal S'(1) to the false lamp FL142, thus taking into account the relationship expressed by Equation 49.

To take into account Equation 47, the sources S(1) and S(2) are connected to two corresponding inputs of an OR gate OG143. The output of this gate is connected to an OR-type truth-value indicator TVI143. This indicator indicates the truth value of the proposition $d(1)+d(2)$, that is, whether it can be concluded that the patient has at least one of the diseases D1 and D2.

With the circuit of FIG. 14, if one assumes that the doctor knows that a symptom is present or that it is not present, only four situations (A, B, C, and D) arise; but if it is assumed that the doctor may not know whether or not a symptom is present, nine possible situations (A, B, C, D, E, F, G, H, and I) arise. In case the doctor is only considering two symptoms ordinarily not great difficulty is involved in determining whether or not symptoms are present, but in more complicated situations, a diagnosis may be defective because a doctor has overlooked determining whether or not a particular symptom is present. Let us assume that such a situation could occur in the present instance.

*Table F14*

| Situation | S(1) | S(2) | TL141 | FL141 | D(1) | TL142 | FL142 | D(2) |
|---|---|---|---|---|---|---|---|---|
| A | 1 | 1 | On | Off | +1 | Off | Off | 0 |
| E | 1 | 0 | Off | Off | 0 | Off | Off | 0 |
| B | 1 | −1 | Off | Off | 0 | On | Off | +1 |
| G | 0 | 1 | On | Off | +1 | Off | Off | 0 |
| I | 0 | 0 | Off | Off | 0 | Off | Off | 0 |
| H | 0 | −1 | Off | Off | 0 | Off | Off | 0 |
| C | −1 | 1 | On | On | +1 | Off | On | −1 |
| F | −1 | 0 | Off | Off | 0 | Off | On | −1 |
| D | −1 | −1 | Off | On | −1 | Off | On | −1 |

The nine possible situations that can arise are represented in Table F14. In Table F14, the truth value of the symtom propositions $s(1)$ is indicated in column 2, the truth value of the symptom proposition $s(2)$ is indicated in column 3, the condition of the true lamp TL141 is indicated in column 4, the condition of the false lamp FL141 is indicated in column 5, the truth value of the disease proposition $d(1)$ is indicated in column 6, the condition of the true lamp TL142 is indicated in column 7, the condition of the false lamp FL142 is indicated in column 8, and the truth value of the disease proposition $d(2)$ is indicated in column 9. The nine situations previously described are indicated in column 1.

For any particular set of truth values of the symptoms, the conditions of the lights of the truth-value indicators TVI141 and TVI142 are indicated in the row in which the truth values of the symptoms are presented and the conclusion to be drawn from the indications of the lamps is also given. The indications of the truth-value indicator TVI143 are not tabulated.

By way of example, if the patient is known to have symptom $s1$ and it is not known whether he has symptom $s2$, then the proper diagnosis is that the patient has at least one of the diseases, but the doctor cannot tell whether the patient has disease $d1$ or disease $d2$. No conclusion can be drawn by the doctor as to which disease the patient has until he receives further information. The fact that the patient has at least one of the diseases is indicated by the fact that the true lamp TL143 of the truth-value indicator TVI143 is "on,' but neither true lamp of the indicators TVI141 and TVI142 is "on." See row 2 of Table F14. If now the doctor, by interrogating the patient or by having tests made, determines that the patient has symptom $s2$, then as indicated in row 1, the doctor now knows that the patient has disease $d1$, but he has no knowledge as to whether the patient has disease $d2$. See row 1 on Table F14. If, on the other hand, the doctor determines that the patient does not have sympton $s2$, he can conclude properly that the patient has disease $d2$, but he can draw no conclusion as to whether or not the patient has disease $d1$. See row 3 of Table F14. In case the doctor has no knowledge as to whether the patient has symptom $s1$, the only time he can draw any conclusion with respect to either diseases is that represented by row 4. In this case, if the patient has symptom *s2*, the doctor can draw the conclusion that the patient has disease *d1*. However, if the doctor does not know whether the patient has symptom *s2*, or if he knows that the patient does not have symptom *s2*, he can draw no conclusion with respect to the presence or absence of either of the diseases *d1* or *d2*. Examining rows 7, 8, and 9, it is to be noted that if it is known that the patient does not have sympton *s1*, then it can be concluded with certainty that the patient does not have disease *d2*. However, the truth value of the diagnosis with respect to disease *d1* in this case is the same as the truth value of the symptom *s2*. In other words, if the patient does not have symptom *s1* he has disease *d1* if he has symptom *s2*, and he does not have disease *d1* if he does not have symptom *s2*. However, if it is not known whether or not he has symptom *s2*, no conclusion can be drawn as to whether he has disease *d1*.

Actually, all the foregoing conclusions can be readily drawn from Table F14*a*:

*Table F14a*

| | s(2) | s'(2) |
|---|---|---|
| s(1) | d(1) | d(2) |
| s'(1) | d(1)d'(2) | d'(1)d'(2) |

This table summarizes the relations expressed by Equations 48, 49, 50 and 51. In this table, for example, if it is known that the patient has symptoms *s2*, but it is not known whether he has symptom *s1*, it can be concluded that he has disease *d1* because the term *d1* appears in both of the spaces of the table that are below the heading *s2*. However, it is apparent that where more complicated situations arise involving a greater number of symptoms, the use of tables can be extremely difficult and the diagnosis can be greatly simplified by employing logic machines designed in accordance with the principles set forth herein.

In FIG. 15, there is shown a circuit that represents a hypothetical relationship that might exist between two diseases and three symptoms. This circuit employs four gates: gate AG152 that produces a manifestation of the truth value of the disease *d1*; gate AG153 that produces a manifestation of the truth value of the absence of disease *d1*; gate AG154 that produces a manifestation of the truth value of the presence of disease *d2*; and gate AG155 that produces a manifestation of the truth value of the absence of disease *d2*.

Three pairs of sources are employed: source S(1) and source S'(1) supply manifestations of the truth values of the presence and absence respectively of the symptom *s1*; source S(2) and source S'(2) supply manifestations of the truth values of the presence and absence respectively of the symptom *s2*; source S(3) and source S'(3) supply manifestations of the truth values of the presence and absence respectively of the symptom *s3*. In this particular case, it is assumed that the diseases may be implied from the presence or absence of the symptoms in accordance with the following equations:

$$s(1)s'(2) \supset d(1) \quad (52)$$

$$s'(1)s(2) \supset d'(1) \quad (53)$$

$$s'(1)s'(2)s(3) \supset d(2) \quad (54)$$

$$s(1)s'(2)s'(3) \supset d'(2) \quad (55)$$

The logic of Equation 52 is represented in the circuit by the connection of one input circuit of gate AG152 to the output terminal of source S(1) and by the connection of another input circuit of gate AG152 to the output terminal of source S'(2). The logic represented by Equation 53 is expressed by the connection of one input circuit of AND gate AG153 to the output terminal of source

S'(1) and by the connection of another input circuit of the gate AG153 to the output terminal of source S(2). The logic of Equation 54 is expressed by connecting each of three input circuits of the AND gate AG154 to the output terminals of the three sources S'(1), S'(2) and S(3) respectively. The logic of Equation 55 is expressed by connecting three input circuits to the output terminals of source S(1), source S'(2) and source S'(3). In this case, the true lamp TL151 of the truth-value indicator TVI151 has one terminal connected to the output circuit of AND gate AG152 and the other terminal connected to the negative terminal −V of the voltage supply. The false lamp FL151 of the truth-value indicator TVI151 has one terminal connected to the output circuit of AND gate AG153 and the other terminal connected to the negative terminal −V of the voltage supply. The true lamp TL152 of the truth-value indicator TVI152 has one terminal connected to the output circuit of AND gate AG154 and the other terminal connected to the negative terminal −V of the voltage supply. The false lamp FL152 of the truth-value indicator TVI152 has one terminal connected to the output circuit of AND gate AG155 and the other terminal connected to the negative terminal −V of the voltage supply.

With the circuit of FIG. 15, then, a doctor can determine whether or not either or both of diseases *d*(1) and *d*(2) are present and depending upon the truth values respecting the presence and absence of the symptoms *s1*, *s2* and *s3*.

It is interesting to note that in the circuits of FIGS. 14 and 15, the manifestations of the truth values of the diseases appear as voltages on two output lines, and that, except for truth-value indicator TVI143, the lamps of the truth-value indicators are connected to different lines. The true lamp and the false lamp of each of truth-value indicators TVI142, TVI142, TVI151, and TVI152 are connected to different lines. This arrangement, therefore, is considerably different from that involved in the circuits of FIGS. 2, 3, and 6 to 15, where the two lamps of each truth-value indicator is connected to only one output line. As indicated above, this condition arises because, in the logical equations corresponding to the circuits of FIGS. 14 and 15, both the propositions D(1) and D(2) and their negates D'(1) and D'(2) are present.

It will be understood, of course, that the analysis of medical problems is not limited to the use of the AND gates and OR gates of the same order, but that more complex situations may arise than those represented in FIGS. 14 and 15 which require the use of interconnected OR gates and AND gates where the medical laws that are applicable involve the sums of products or the products of sums.

GENERAL COMMENTS AND OTHER SYSTEMS

From the foregoing description of the invention, it is apparent that I have provided a relatively simple system for solving practical problems in logic, which take into account the possibility that it may not be known whether some of the statements involved in the logical problem are true or whether they are false. Furthermore, it is clear that I have provided a system which makes possible the solution of such problems by the use of three-level signal sources and three-level truth-value indicators by employing diode logic circuits. It is interesting to note that use was made of two-valued logic in deriving sets of propositions to use as a basis for design of the gate arrangements of FIG. 14, but that three-valued logic was employed with respect to signals at the input and the output. Thus, even though two-valued logic is useful in deriving equations, three-valued logic is useful in their interpretation. In the system described, it is possible, as shown above, to solve logic problems by means of truth values which can be represented by single digits, namely 1, 0, and −1, voltages +V, O, and −V have been employed as manifestations of signals representing the corresponding truth values +1, 0, and −1, respectively. Actually, of course, the values of the voltages employed may be taken relative to some other point than the ground voltage to which reference has been made, and the truth values may be assigned different numerical values than those employed, so long as they are arranged in a sequence. Furthermore, the truth values may be manifested in some other form than D.C. electrical signals.

In the specific form of truth-value indicators illustrated in connection with the logic circuits shown in FIGS. 1 to 15, the values of the voltage V were made less than the sustaining voltages of the gaseous discharge lamps employed therein. Under these conditions, both the true lamp and the false lamp were "off" when the truth-value manifestation applied to the truth-value indicator represented unknown truth and falsity. In an alternative embodiment of the invention, the value of the voltage V is made greater than the sustaining voltage. In this case, both lamps of the truth-value indicator are "on" when the truth-value manifestation applied thereto corresponds to unknown truth and unknown falsity and only one lamp or the other is "off" when the truth-value manifestation corresponds to known truth or else to known falsity. This arrangement too, therefore, provides three types of indications: one corresponding to known truth; one corresponding to known falsity; and one corresponding to unknown truth and unknown falsity.

It will be understood, of course, that other types of truth-value indicators may be employed. For example, the truth-value indicator may be in the form of a voltmeter or other device adapted to display a different signal for indicating the truth value of the truth-value manifestation appearing in the circuit to which the indicator is connected.

The truth-value system employed in the invention illustrated in FIGS. 1 to 15 inclusive is particularly useful, since it utilizes a three-value system which takes into account the fact that propositions may be known to be true, or they may be known to be false, or they may not be known to be true and not known to be false. In some cases, however, it may be desirable to employ a multi-valued logic that utilizes a still larger number of truth values than three. So long as the logic obeys the rules of conjunction, disjunction, negation, and implication set forth above, the same circuits may be used in solving logic problems by employing multi-level sources which supply any one of a series of voltages that represent the corresponding truth values.

More particularly, if the truth values of the system are $T_1$, $T_2$, $T_3$, $T_4$, and $T_5$, a suitable truth-value source $S_{16}$ is illustrated in FIG. 16. This source employs a five-tap switch with the successive taps connected to a power supply providing the voltages −V, −V/2, 0, +V/2, and +V. In this case, a truth-value indicator TV117 of the type illustrated in FIG. 17 is suitable to use. This truth-value indicator includes five truth-value lamps designated by the symbols TL171, TL172, TL173, TL174, and TL175, which are connected respectively to sources of voltage that supply the voltages −V, −V/2, 0, +V/2, +V. With this truth-value indicator, all the lamps are on at any time, except the one which represents the truth value of the signal applied to the input of the truth-value indicator.

To apply a five-valued logic to various circuits illustrated in FIGS. 1 to 13, the same diode circuits may be used without changing the voltages V and −V applied to the gate units provided that five-level sources of FIG. 16 are employed in place of the three-level sources of FIG. 1 in the various circuits and provided that the five-level truth-value indicator of FIG. 17 is employed in place of the three-level truth-value indicators previously described. Similar changes may be made where it is desired to make use of a four-valued logic or a logic having a higher number of truth values.

In the case of five-valued logic, the truth values may be assigned the following interpretations:

T5=certainly true
T4=more likely to be true than false
T3=very uncertain
T2=more likely to be false than true
T=certainly false However, great weight should not be attached to the relative values of conclusions drawn, except to the extent that some conclusion may be "certainly true," others "certainly false," and other "neither certainly true nor certainly false." The truth values $T_2$, $T_3$, and $T_4$ apply to the latter truth value of a conclusion.

It may not seem realistic to mathematicians to apply such a five-valued logic to probabilistic statements. No claims is made that such logic will always provide mathematically accurate conclusions consistent with the result obtainable in the theory of probability. However, the foregoing illustration of five-valued logic applied to probability-type statements illustrates how my invention may be employed with five-valued logic.

This invention may also be applied to multiple valued logic employing ranking concepts. For example, it may be employed to solve a problem involving ranking of people in different groups, according to their height. For example, it may be employed to answer such a question as the following: What is the value of the higher grade, the grade of the two Smith sisters who received the lower grade, or the grade of the three Jones brothers who received the highest grade? This problem may be solved by means of the circuit of FIG. 6 where switch S*a* corresponds to Smith sister A, switch S*b* corresponds to Smith sister B, switch S*c* corresponds to Jones brother C, switch S*d* corresponds to Jones brother D, switch S*e* corresponds to Jones brother E. In this case, it is assumed that only three possible grades are available: +1, 0 and −1. By setting each of the switches S*a* . . . S*e* in the position corresponding to the respective grades of the five persons, the grade is indicated at the output of the OR gate OG6. Thus, if the grades received by the respective persons A, B, C, D, and E were respectively 0, +1, 0, +1, −1, the higher of the two low grades of interest would be 0, namely, the grade received by the Smith sister A. This would be indicated by the condition of the truth valued circuit TV16.

The system of FIG. 7 could similarly be employed to answer the question: What is the value of the lower grade in school, the grade of the two Smith sisters who received the higher grade, or the grade of the three Jones brothers who received the highest grade?

The invention could be applied to a ranking problem involving a larger number of values. Thus, for example, by utilizing in FIG. 6 an input circuit of the type illustrated in FIG. 16 at the inputs of the AND gates AG61 and AG62 and a truth value indicator as illustrated in FIG. 17 at the output of the OR gate OG6, the foregoing question regarding the value of the higher grade could be answered if five grades are possible. Similarly, by employing such substitutions of the OR gates OG71 and OG72 and at the output of the AND gate AG7 of FIG. 7, one could answer the foregoing question about the value of the lower grade.

In any event, it is clear that I have provided a simple system that makes possible the use of manually-operated switches with D.C. power supplies for solving problems in multi-valued logic. It will be understood, of course, that the invention may be applied in many other ways in accordance with the principles set forth above, and that other types of multi-level input signals and other types of logic units and other types of truth-value indicators may be employed without departing from the principles of the invention.

The invention claimed is:

1. A system for producing manifestations representative of the truth value of a predetermined logical combination of a plurality of propositions, comprising:

a plurality of control means settable to produce manifestations respectively representative of the truth values of said plurality of propositions, each of said settable control means being selectively settable in any one of three different conditions to produce a corresponding one of three discretely different manifestations representative respectively of known truth, known falsity, and unknown truth or falsity of a given proposition, and a logical combining circuit having a plurality of inputs and a main output, said inputs being respectively coupled to said plurality of control means, said combining circuit including a plurality of logic means interconnected with each other and to said inputs and said main output in accordance with said predetermined logical combination of said plurality of propositions, at least one of said logic means of said combining circuit comprising a logical AND gate unit which produces at its output a manifestation having a value representing the value of the lowest valued manifestation of the manifestations being applied to its inputs and at least another one of said logic means comprising a logical OR gate unit which produces at its output a manifestation having a value representing the value of the highest valued manifestation of the manifestations being applied to its inputs, the manifestation appearing at the output of one of said gate units providing a manifestation that is applied to the input of the other gate unit, said interconnected logic means being jointly responsive to every possible set of manifestations producible by said plurality of control means for producing a corresponding one of said three manifestations in said main output in accordance with the set of manifestations being applied to said inputs, the one of said three manifestations being produced at said output in response to the set of manifestations being applied to said inputs being in accordance with the truth value of said predetermined logical combination.

2. The system of claim 1, including truth-value indicating means connected to the output of said logical combining circuit, and responsive to the manifestation produced there for indicating the truth value of said logical combination of said propositions.

3. The system of claim 1, including truth-value indicating means connected to the output of said logical combining circuit, said truth-value indicating means including a true indicator operated by the output manifestation only when the output manifestation represents known truth and a false indicator operated by the output manifestation only when the output manifestation represents known falsity.

4. A system for producing manifestations representative of the truth value of a logical combination of a plurality of propositions, comprising:

a source of power for supplying at three terminals a low potential, an intermediate potential, and a high potential, respectively, a plurality of switch means each of which is connectable to any one of said three terminals to selectively provide potentials respectively representative of the truth values of said plurality of propositions, each of said switch means selectively producing low, medium, and high potentials representative respectively of known truth, unknown truth or falsity, and known falsity of a corresponding given proposition, and a logical combining circuit having a plurality of inputs and an output, said inputs being respectively connected to said plurality of switch means, said combining circuit including logic means jointly responsive to some sets of switch potentials for producing a low output potential and to other sets of switch potentials for producing an intermediate output potential and to still other sets of switch potentials for producing a high output potential, each of said output potentials being representative of the truth value of a predetermined logical combination of said plurality of propositions, said logic means comprising a plurality of interconnected gating units each of which has a plurality of inputs and an output, at least one of said gating units being a gating unit of one kind and at least one other of such gating units being a gating unit of another kind, the output of said gating unit of said one kind being connected to the input of said gating unit of said another kind, each gating unit of one of said kinds being an AND gating unit and each remaining gating unit being an OR gating unit, each of said AND gating units producing said low, intermediate, and high output potentials at different times corresponding at any given time to the lowest of the potential then being applied to its inputs, and each of said OR gating units producing said low, intermediate, and high output potentials at different times corresponding at any given time to the highest value of the potentials then being applied to its inputs.

5. A logic system as defined in claim 4 in which said logical combining circuit comprises two logic circuits and in which two of said switch means that are connected to inputs of said two logic circuits respectively are ganged, whereby one of said switch means supplies a low, medium, or high potential to one of said logic circuits at the same time that the other switch means supplies a high, medium, or low potential to the other of said logic circuits.

6. The system of claim 4, wherein each said AND gating unit comprises a conjunctive gating circuit means having a plurality of inputs and an output, each said conjunctive gating circuit including a plurality of diodes having their anodes connected to the respective inputs and their cathodes connected to said output, means connecting the output of said conjunctive gating circuit to said high-potential terminal of said source, and wherein each said OR gating unit comprises a disjunctive gating circuit means having a plurality of inputs and an output, each said disjunctive gating circuit means including a plurality of diodes having their cathodes connected to the respective latter inputs and their anodes connected to said latter output, and means connecting the output of each said disjunctive gating circuit to said low-potential terminal of said power source.

7. The system of claim 4 comprising a true lamp connected to the output of said logical combining circuit and to the low-potential terminal of said source, and a false lamp connected to the output of said logical combining circuit and to the high-potential terminal of said source.

8. The system of claim 4 comprising a true lamp connected between each switch and to the low-potential terminal of said source, and a false lamp connected between each switch and to the high-potential terminal of said source, whereby the truth value of each proposition manifested by a corresponding switch is indicated, and a true lamp connected to the output of said logical combining circuit and to the low-potential terminal of said source, and a false lamp connected to the output of said logical combining circuit and to the high-potential terminal of said source, whereby the truth value of said logical combination of said propositions corresponding to any set of settings of said switches is indicated.

9. A system for producing manifestations representative of the truth value of a logical combination of a plurality of propositions, comprising:

a source of power for supplying at three terminals a low potential, an intermediate potential, and a high potential respectively;

a plurality of switch means independently connectable to any one of said three terminals to selectively provide potentials respectively representative of the truth values of said plurality of propositions, each of said switch means selectively producing low, medium, and high potentials representative respectively of known falsity and unknown truth and falsity, and known truth of a corresponding given proposition;

gating circuit means having a plurality of inputs and an output, said gating circuit means including a plurality of unidirectional signal transfer devices connected between said output and the respective inputs;

each of said plurality of switching means supplying one of said potentials at a time to a different one of said inputs, and switching means being adapted to provide various combinations of such potentials to said inputs at various times, some of said combinations including two of said potentials and others of said combinations including three of said potentials, said gating circuit means being biased to produce first, second and third output signals of different potentials at different times, the output signal at any given time having a value corresponding to that extreme value, in the combination then being applied to its input, which lies nearest a selected end of a linear order of said three different potentials; and means connected to said power source and operated by said output signal for producing a truth value manifestation that is of low, intermediate, or high value depending on whether said extreme value is low, intermediate, or high respectively.

10. A logic circuit comprising a plurality of extreme value signal selectors, each having an output and a plurality of inputs, some of said signal selectors being of a first kind and others being of a second kind, each signal selector of said first kind producing at its output a signal that manifests a value that corresponds to the maximum value manifested by signals applied to its inputs, and each signal selector of said second kind producing at its output a signal that manifests a value that corresponds to the minimum value manifested by signals applied to its inputs, means connecting at least some of the inputs of some signal selectors to the outputs of other signal selectors, whereby all of said signal selectors are interconnected, and a plurality of multi-value signal sources connected in different combinations to the remaining inputs of said signal selectors.

11. A logic circuit as defined in claim 10, comprising multi-value signal-indicating means connected to the remaining outputs of said signal selectors.

12. Apparatus for ascertaining the truth value of a main compound proposition compounded of component propositions, in which the compound proposition involves both logical sums and logical products of terms that are component propositions or subsidiary compound propositions of such terms comprising:

means for generating electric signals having values respectively representative of the truth values of a plurality of said component propositions, the respective signals being of high, intermediate, or low value according to whether the corresponding component propositions are known to be true, or are not known to be true or false, or are known to be false;

logic means for developing an electric signal that indicates whether the main compound proposition is true, or is of unknown truth and falsity, or is false, in accordance with the truth values of said component propositions;

said logic means comprising means including a common electroresponsive unit for detecting differences in the values of electric signals corresponding to component terms that appear as terms of each logical sum, and developing in accordance with the detected differences an electric signal that has a value corresponding to the highest truth value of the component propositions of said each logical sum;

said logic means also comprising means including a second common electroresponsive unit detecting the differences in value of electric signals corresponding to component terms that appear as terms of each logical product, and developing in accordance with the detected differences an electric signal that has a value corresponding to the lowest truth value of the component terms of said each logical product.

13. A logic circuit comprising:

a logic gate unit having an output and a plurality of inputs;

signal source means providing signals having at least three discrete manifestations representative of values arranged in a linear order including a low value, an intermediate value, and a high value;

a plurality of signal transfer means for selectively transferring from said signal source means to said inputs various combinations of signals manifesting such values;

said logic gate unit sometimes producing an output signal manifesting a low value, sometimes an output signal manifesting an intermediate value and sometimes an output signal manifesting a high value depending on the combination of signals then being transferred to said inputs, said logic gate unit comprising means responsive to every combination of signals transferred to said inputs for generating a signal at the output of said gate unit that manifests a value corresponding to the extreme value manifested by the signal values in said transferred combination that lies nearest a preselected end of said linear order;

utilization means connected to said output and differently responsive to the signal at said output according to whether the signal at said output manifests said low value, said intermediate value, or said high value.

14. A logic circuit comprising:

a signal source means providing signals that manifests at least three discrete values arranged in a linear order including a low level, an intermediate level, and a high level;

a logic unit having an output and a plurality of inputs, said logic unit comprising:

a plurality of extreme-value signal selectors of a first kind, each of the signal selectors of said first kind having a plurality of inputs and an output, an extreme-value signal selector of a second kind having an output and a plurality of inputs each of said signal selectors being adapted to produce at its output a signal that manifests a low value or an intermediate value or a high value depending on the values of the signals applied to the inputs of said each signal selector, the output of each of the signal selectors of said first kind feeding signals to a corresponding input of said signal selector of said second kind, each of the remaining inputs of all said signal selectors that are not fed such signals constituting inputs to said logic unit and the output of said signal selector of said second kind constituting the output of said logic unit, each extreme-value signal selector of one kind producing at its output a signal that manifests a value that corresponds to the maximum value of the values manifested by the signals being fed to its inputs, and each signal selector of the other kind producing at its output a signal that manifests a value that corresponds to the minimum value of the values manifested by the signals being fed to its inputs, a plurality of signal transfer means for selectively feeding to said inputs of said logic unit a succession of input combinations of signals manifesting said three values whereby a signal manifesting a low value is produced at the output of said logic unit for some input combinations and whereby a signal manifesting an intermediate value is produced at the output of said logic unit for other input combinations and whereby a signal manifesting a high value is produced at the output of said logic unit for still other input combinations, and utilization means connected to said output of said logic unit that is differently responsive to signals that manifest said low, intermediate, and high values.

15. A logic circuit comprising:

a first plurality of extreme-value signal selectors of a first kind, each of which has an output and a plurality of inputs, each signal selector of said first kind being adapted to produce at its output a signal manifesting any one of three discrete values, the value manifested by the signal being produced at its output at any time corresponding to the maximum value of the values of signals being applied to its inputs at that time, a second plurality of extreme-value signal selectors of a second kind, each of which has an output and a plurality of inputs, each signal selector of said second kind being adapted to produce at its output a signal manifesting any one of such three discrete values, the value of the signal being produced at its output at any time corresponding to the minimum value of the values of signals being applied to its inputs at that time, means for interconnecting said signal selectors including means for applying the outputs of some of the signal selectors of one of said two kinds to the inputs of some of the signal selectors of the other of said two kinds, and a plurality of at least three multi-value signal sources each of which is connected to at least one of the remaining inputs of all said signal selectors, at least some of said remaining inputs of said signal selectors being connected to different multi-value signal sources, said signal sources being respectively adapted to apply, to said remaining inputs to which it is connected, a signal that sometimes manifests one value, sometimes another, and sometimes a third, whereby various combinations of signals of said three values can be applied to said remaining inputs.

16. A logic circuit as defined in claim 15 comprising a multi-value signal-indicating means connected to at least one of said signal selector outputs that is not connected to the input of another signal selector, said multi-value signal-indicating means being adapted to produce three different indications corresponding respectively to said three values.

17. A logic circuit as defined in claim 15 including means interlocking two of said multi-value signal sources for causing said two sources to simultaneously apply signals which are the negates of one another.

18. A logic circuit as defined in claim 15 wherein at least one of said signal sources is connected to an input of each of at least two of said signal selectors.

No references cited.

ROBERT C. BAILEY, *Primary Examiner.*